US008705765B2

(12) United States Patent
Bongiovi

(10) Patent No.: US 8,705,765 B2
(45) Date of Patent: *Apr. 22, 2014

(54) RINGTONE ENHANCEMENT SYSTEMS AND METHODS

(75) Inventor: Anthony Bongiovi, Port St. Lucie, FL (US)

(73) Assignee: Bongiovi Acoustics LLC., Port St. Lucie, FL (US)

(*) Notice: Subject to any disclaimer, the term of this patent is extended or adjusted under 35 U.S.C. 154(b) by 697 days.

This patent is subject to a terminal disclaimer.

(21) Appl. No.: 12/683,200

(22) Filed: Jan. 6, 2010

(65) Prior Publication Data

US 2010/0284528 A1 Nov. 11, 2010

Related U.S. Application Data

(63) Continuation-in-part of application No. 12/648,007, filed on Dec. 28, 2009, now Pat. No. 8,565,449, which is a continuation-in-part of application No. 11/947,301, filed on Nov. 29, 2007, now Pat. No. 8,160,274, which is a continuation-in-part of application No. 11/703,216, filed on Feb. 7, 2007, now abandoned.

(60) Provisional application No. 60/861,711, filed on Nov. 30, 2006, provisional application No. 60/765,722, filed on Feb. 7, 2006.

(51) Int. Cl.
*H03G 5/00* (2006.01)

(52) U.S. Cl.
USPC ............... 381/103; 381/98; 381/106; 700/94

(58) Field of Classification Search
USPC .............. 381/98, 103, 104, 107, 61; 700/94
See application file for complete search history.

(56) References Cited

U.S. PATENT DOCUMENTS

| 4,162,462 A | 7/1979 | Endoh et al. |
| 4,184,047 A | 1/1980 | Langford |
| 4,353,035 A | 10/1982 | Schroder |
| 4,356,558 A | 10/1982 | Owen |
| 4,363,007 A | 12/1982 | Haramoto et al. |
| 4,517,415 A | 5/1985 | Laurence |
| 4,538,297 A | 8/1985 | Waller, Jr. |

(Continued)

FOREIGN PATENT DOCUMENTS

| JP | 3150910 | 6/1991 |
| JP | 07106876 A | 4/1995 |

(Continued)

OTHER PUBLICATIONS

"NovaSound International Inc", http://www.novasoundint.com/new_page_t.htm, 2004.

*Primary Examiner* — Disler Paul
(74) *Attorney, Agent, or Firm* — Malloy & Malloy, P.L.

(57) ABSTRACT

The present invention(s) provides for methods and systems for digitally processing a ringtone. In various embodiments, a method comprises generating a profile comprising a plurality of filter equalizing coefficients, configuring a plurality of filters of a graphic equalizer using the plurality of filter equalizing coefficients from the profile, receiving a ringtone for processing, adjusting the plurality of filters using a first gain, equalizing the ringtone using the plurality of filters of the graphic equalizer, and outputting the equalized ringtone.

14 Claims, 18 Drawing Sheets

(56) References Cited

U.S. PATENT DOCUMENTS

| | | |
|---|---|---|
| 4,584,700 A | 4/1986 | Scholz |
| 4,612,665 A | 9/1986 | Inami |
| 4,677,645 A | 6/1987 | Kaniwa et al. |
| 4,696,044 A | 9/1987 | Waller, Jr. |
| 4,701,953 A | 10/1987 | White |
| 4,704,726 A | 11/1987 | Gibson |
| 4,739,514 A | 4/1988 | Short et al. |
| 4,815,142 A | 3/1989 | Imreh |
| 4,856,068 A | 8/1989 | Quatieri et al. |
| 4,887,299 A | 12/1989 | Cummins et al. |
| 5,133,015 A | 7/1992 | Scholz |
| 5,210,806 A | 5/1993 | Kihara et al. |
| 5,361,381 A | 11/1994 | Short |
| 5,463,695 A | 10/1995 | Werrbach |
| 5,465,421 A | 11/1995 | McCormick |
| 5,541,866 A | 7/1996 | Sato et al. |
| 5,572,443 A | 11/1996 | Emoto et al. |
| 5,617,480 A | 4/1997 | Ballard et al. |
| 5,640,685 A | 6/1997 | Komoda |
| 5,699,438 A | 12/1997 | Smith et al. |
| 5,832,097 A | 11/1998 | Armstrong et al. |
| 5,872,852 A | 2/1999 | Dougherty |
| 5,990,955 A | 11/1999 | Koz |
| 6,078,670 A | 6/2000 | Beyer |
| 6,108,431 A | 8/2000 | Bachler |
| 6,263,354 B1 | 7/2001 | Gandhi |
| 6,285,767 B1 | 9/2001 | Klayman |
| 6,292,511 B1 | 9/2001 | Goldston et al. |
| 6,317,117 B1 | 11/2001 | Goff |
| 6,318,797 B1 | 11/2001 | Bohm et al. |
| 6,535,846 B1 | 3/2003 | Shashoua |
| 6,871,525 B2 | 3/2005 | Withnall |
| 6,907,391 B2 | 6/2005 | Bellora et al. |
| 6,999,826 B1 * | 2/2006 | Zhou et al. .................. 700/94 |
| 7,006,653 B2 | 2/2006 | Guenther |
| 7,016,746 B2 * | 3/2006 | Wiser et al. .................. 700/94 |
| 7,058,463 B1 | 6/2006 | Ruha et al. |
| 7,123,728 B2 | 10/2006 | King et al. |
| 7,254,243 B2 | 8/2007 | Bongiovi |
| 7,266,205 B2 * | 9/2007 | Miller ........................... 381/103 |
| 7,274,795 B2 | 9/2007 | Bongiovi |
| 7,778,718 B2 | 8/2010 | Janke et al. |
| 2003/0035555 A1 | 2/2003 | King et al. |
| 2003/0112088 A1 | 6/2003 | Bizjak |
| 2003/0216907 A1 | 11/2003 | Thomas |
| 2004/0022400 A1 | 2/2004 | Magrath |
| 2004/0086144 A1 | 5/2004 | Kallen |
| 2004/0146170 A1 | 7/2004 | Zint |
| 2005/0201572 A1 | 9/2005 | Lindahl et al. |
| 2005/0249272 A1 | 11/2005 | Kirkeby et al. |
| 2005/0254564 A1 | 11/2005 | Tsutsui |
| 2006/0034467 A1 | 2/2006 | Sleboda et al. |
| 2006/0064301 A1 | 3/2006 | Aguilar et al. |
| 2006/0098827 A1 | 5/2006 | Paddock et al. |
| 2006/0126865 A1 | 6/2006 | Blamey et al. |
| 2006/0140319 A1 | 6/2006 | Eldredge et al. |
| 2006/0291670 A1 | 12/2006 | King et al. |
| 2007/0223713 A1 | 9/2007 | Gunness |
| 2007/0253577 A1 | 11/2007 | Yen et al. |
| 2008/0112576 A1 | 5/2008 | Bongiovi |
| 2008/0123870 A1 | 5/2008 | Stark et al. |
| 2008/0123873 A1 | 5/2008 | Bjorn-Josefsen et al. |
| 2008/0137881 A1 | 6/2008 | Bongiovi |
| 2008/0219459 A1 | 9/2008 | Bongiovi et al. |
| 2009/0054109 A1 * | 2/2009 | Hunt ............................. 455/567 |
| 2009/0290725 A1 | 11/2009 | Huang |
| 2010/0303278 A1 | 12/2010 | Sahyoun |

FOREIGN PATENT DOCUMENTS

| | | |
|---|---|---|
| JP | 2005-500768 | 1/2005 |
| SU | 1319288 | 12/1985 |
| WO | WO 2006/020427 A2 | 2/2006 |
| WO | WO 2007/092420 A2 | 8/2007 |

* cited by examiner

Figure 2: Low shelving filters with cutoff frequency at 1000 Hz and gains ± *GdB*

Figure 3: Making a Low Shelving Filter by Summing High-Pass and Low-Pass Filters Figure 4: High shelving filters with cutoff frequency at 1000 Hz and gains ÷ $GdB$ Figure 5: Frequency Response of a Bell Filter Figure 6: Expanded View of Graphic Equalizer Block GEQ(z) From Figure 1

Figure 7: Making a Filter Via the Mitra-Regalia Realization

Figure 8: Magnitude-Complementary Low-Shelving Filters

Figure 9: Implementation of Magnitude-Complementary Low-Shelving Filter

Figure 10: Compressor static Transfer Characteristic

Figure 11: Direct Form Type 1 Implementation of 2nd-Order Transfer Function

Figure 12: Direct Form Type 1 Implementation of 2$^{nd}$-Order Transfer Function

RINGTONE ENHANCEMENT SYSTEMS AND METHODS

CROSS-REFERENCE TO RELATED APPLICATIONS

This application is a continuation-in-part of U.S. application Ser. No. 12/648,007, filed Dec. 28, 2009, now U.S. Pat. No. 8,565,449 entitled "System and Method for Digital Signal Processing" and seeks priority to U.S. application Ser. No. 12/474,050, filed May 28, 2009, entitled "Mismatched Speaker Systems and Methods," which are both a continuation-in-part of U.S. application Ser. No. 11/947,301, filed Nov. 29, 2007, now U.S. Pat. No. 8,160,274 which claims priority to U.S. Provisional Application No. 60/861,711 filed Nov. 30, 2006, and is a continuation-in-part of U.S. application Ser. No. 11/703,216, filed Feb. 7, 2007, now abandoned which claims priority to U.S. Provisional Application No. 60/765,722, filed Feb. 7, 2006. Each of the above applications is incorporated by reference herein in its entirety.

FIELD OF THE INVENTION

The present invention relates to a speaker system and method. More particularly, the present invention relates to ringtone enhancement systems and methods.

BACKGROUND OF THE INVENTION

Historically, studio-quality sound, which may be described as the full reproduction of the complete range of audio frequencies that are utilized during the studio recording process, has only been able to be achieved, appropriately, in audio recording studios. Studio-quality sound may be characterized by the level of clarity and brightness which is attained only when the upper-mid frequency ranges are effectively manipulated and reproduced. While the technical underpinnings of studio-quality sound can be fully appreciated only by experienced record producers, the average listener can easily hear the difference that studio-quality sound makes.

While various attempts have been made to reproduce studio-quality sound outside of the recording studio, those attempts have come at tremendous expense (usually resulting from advanced speaker design, costly hardware, and increased power amplification) and have achieved only mixed results. Thus, there exists a need for a process whereby studio-quality sound can be reproduced outside of the studio with consistent, high quality, results at a low cost. There exists a further need for audio devices embodying such a process, as well as computer chips embodying such a process that may be embedded within audio devices. There also exists a need for the ability to produce studio-quality sound through inexpensive speakers.

In cellular telephones, little has been done to enhance and optimize the audio quality of the voice during a conversation or of audio programming during playback. Manufacturers have, in some cases, attempted to enhance the audio, but generally this is accomplished utilizing the volume control of the device. The general clarity of the voice 'sound' remains fixed. The voice is merely amplified and/or equalized. Moreover, the settings for amplification and/or equalization are also fixed and cannot be altered by the user.

Further, the design of audio systems for vehicles involves the consideration of many different factors. The audio system designer selects the position and number of speakers in the vehicle. The desired frequency response of each speaker may also be determined. For example, the desired frequency response of a speaker that is located on the instrument panel may be different than the desired frequency response of a speaker that is located on the lower portion of the rear door panel.

The audio system designer must also consider how equipment variations impact the audio system. For example, an audio system in a convertible may not sound as good as the same audio system in the same model vehicle that is a hard top. The audio system options for the vehicle may also vary significantly. One audio option for the vehicle may include a basic 4-speaker system with 40 watts amplification per channel while another audio option may include a 12-speaker system with 200 watts amplification per channel. The audio system designer must consider all of these configurations when designing the audio system for the vehicle. For these reasons, the design of audio systems is time consuming and costly. The audio system designers must also have a relatively extensive background in signal processing and equalization.

Given those considerations, in order to achieve something approaching studio-quality sound in a vehicle historically one would have required a considerable outlay of money, including expensive upgrades of the factory-installed speakers. As such, there is a need for a system that can reproduce studio-quality sound in a vehicle without having to make such expensive outlays.

SUMMARY OF THE INVENTION

The present invention(s) may meet the existing needs described above by providing for a method of digitally processing an audio signal in a manner such that studio-quality sound that can be reproduced across the entire spectrum of audio devices. The present invention(s) may also provide for a computer chip that can digitally processing an audio signal is such a manner, and provide for audio devices that comprise such a chip.

The present invention(s) may further meet the above stated needs by allowing inexpensive speakers to be used in the reproduction of studio-quality sound. Furthermore, the present invention(s) may meet the needs described above by providing for a mobile audio device that can be used in a vehicle to reproduce studio-quality sound using the vehicle's existing speaker system by digitally manipulating audio signals. Indeed, even the vehicle's factory-installed speakers can be used to achieve studio-quality sound using the present invention.

In one embodiment, the present invention(s) provide for a method comprising the steps of inputting an audio signal, adjusting the gain of that audio signal a first time, processing that signal with a first low shelf filter, processing that signal with a first high shelf filter, processing that signal with a first compressor, processing that signal with a second low shelf filter, processing that signal with a second high shelf filter, processing that signal with a graphic equalizer, processing that signal with a second compressor, and adjusting the gain of that audio signal a second time. In this embodiment, the audio signal may be manipulated such that studio-quality sound is produced. Further, this embodiment may compensate for any inherent volume differences that may exist between audio sources or program material, and produces a constant output level of rich, full sound.

This embodiment may also allow the studio-quality sound to be reproduced in high-noise environments, such as moving automobiles. Some embodiments of the present invention(s) allow studio-quality sound to be reproduced in any environment. This includes environments that are well designed with respect to acoustics, such as, without limitation, a concert hall. This also includes environments that are poorly designed with respect to acoustics, such as, without limitation, a traditional living room, the interior of vehicles and the like. Further, some embodiments of the present invention(s) allow the reproduction of studio-quality sound irrespective of the quality of the electronic components and speakers used in association with the present invention. Thus, the present invention(s) may be used to reproduce studio-quality sound with both top-of-the-line and bottom-of-the-line electronics and speakers, and with everything in between.

In some embodiments, systems and methods described herein may be used for playing music, movies, or video games in high-noise environments such as, without limitation, an automobile, airplane, boat, club, theatre, amusement park, or shopping center. Furthermore, in some embodiments, the present invention(s) seek to improve sound presentation by processing an audio signal outside the efficiency range of both the human ear and audio transducers which is between approximately 600 Hz and approximately 1,000 Hz. By processing audio outside this range, a fuller and broader presentation may be obtained.

In some embodiments, the bass portion of the audio signal may be reduced before compression and enhanced after compression, as a result the sound presented to the speakers may have a spectrum substantially rich in bass tones and substantially free of the muffling effects encountered with conventional compression. Furthermore, in some embodiments, as the dynamic range of the audio signal has been reduced by compression, the resulting output may be presented within a limited volume range. For example, the present invention(s) may comfortably present studio-quality sound in a high-noise environment with an 80 dB noise floor and a 110 dB sound threshold.

In some embodiments, the method specified above may be combined with over digital signal processing methods that are perform before the above-recited method, after the above-recited method, or intermittently with the above-recited method.

In another embodiment, the present invention(s) provide for a computer chip that may perform the method specified above. In some embodiments, the computer chip may be a digital signal processor, or DSP. In other embodiments, the computer chip may be any processor capable of performing the above-stated method, such as, without limitation, a computer, computer software, an electrical circuit, an electrical chip programmed to perform these steps, or any other means to perform the method described.

In another embodiment, the present invention(s) provide for an audio device that comprises such a computer chip. The audio device may comprise, for example and without limitation: a radio; a CD player; a tape player; an MP3 player; a cell phone; a television; a computer; a public address system; a game station such as a Playstation 3 (Sony Corporation—Tokyo, Japan), an X-Box 360 (Microsoft Corporation —Redmond, Wash.), or a Nintendo Wii (Nintendo Co., Ltd.—Kyoto, Japan); a home theater system; a DVD player; a video cassette player; or a Blu-Ray player.

In such an embodiment, the chip of the present invention(s) may be delivered the audio signal after it passes through the source selector and before it reaches the volume control. Specifically, in some embodiments the chip of the present invention(s), located in the audio device, processes audio signals from one or more sources including, without limitation, radios, CD players, tape players, DVD players, and the like. The output of the chip of the present invention(s) may drive other signal processing modules or speakers, in which case signal amplification is often employed.

In some embodiments, the present invention(s) provides for a mobile audio device that comprises such a computer chip. Such a mobile audio device may be placed in an automobile, and may comprise, for example and without limitation, a radio, a CD player, a tape player, an MP3 player, a DVD player, or a video cassette player.

In this embodiment, the mobile audio device of the present invention(s) may be specifically tuned to each vehicle it may be used in to obtain optimum performance and to account for unique acoustic properties in each vehicle such as speaker placement, passenger compartment design, and background noise. Also in this embodiment, the mobile audio device of the present invention(s) may provide precision tuning for all 4 independently controlled channels. Also in this embodiment, the mobile audio device of the present invention(s) may deliver about 200 watts of power. Also in this embodiment, the mobile audio device of the present invention(s) may use the vehicle's existing (sometimes factory-installed) speaker system to produce studio-quality sound. Also in this embodiment, the mobile audio device of the present invention(s) may comprise a USB port to allow songs in standard digital formats to be played. Also in this embodiment, the mobile audio device of the present invention(s) may comprise an adapter for use with satellite radio. Also in this embodiment, the mobile audio device of the present invention(s) may comprise an adaptor for use with existing digital audio playback devices such as, without limitation, MP3 players. Also in this embodiment, the mobile audio device of the present invention(s) may comprise a remote control. Also in this embodiment, the mobile audio device of the present invention(s) may comprise a detachable faceplate.

In various embodiments, a method comprises receiving a profile comprising a plurality of filter equalizing coefficients, configuring a plurality of filters of a graphic equalizer with the plurality of filter equalizing coefficients from the profile, receiving a first signal for processing, adjusting the plurality of filters using a first gain, equalizing the first signal using the plurality of filters of the graphic equalizer, outputting the first signal, receiving a second signal for processing, adjusting the plurality of filters, previously configured with the filter equalizing coefficients from the profile, using a second gain, equalizing the second plurality of frequencies of the second signal with the plurality of filters of the graphic equalizer, and outputting the second signal. The profile may be received from a communication network and/or from firmware.

The plurality of filters may be configured using the plurality of filter equalizing coefficients to modify the first signal to clarify a sound of a voice during a telephone communication, to modify the first signal to clarify a sound of a voice in a high noise environment, and/or to modify the first signal to adjust a sound associated with a media file for a handheld device.

Prior to equalizing the first signal, the method may further comprise adjusting a gain of the first signal, filtering the adjusted first signal with a low shelf filter, and compressing the filtered first signal with a compressor. Further, the method may comprise, after equalizing the first signal, compressing the equalized first signal with a compressor, and adjusting the gain of the compressed first signal.

In some embodiments, the method further comprises filtering the first signal with a first low filter, filtering the first signal received from the first low shelf filter with a first high shelf filter prior to compressing the filtered signal with a compressor, filtering the first signal with a second low shelf filter prior to equalizing the first signal with the graphic equalizer, and filtering the first signal with a second high shelf filter after the first signal is filtered with the second low shelf filter.

The plurality of filters of the graphic equalizer may comprise eleven cascading second order filters. Each of the second order filters may be bell filters.

In some embodiments, a system comprises a graphic equalizer. The graphic equalizer may comprise a filter module, a profile module, and an equalizing module. The filter module comprises a plurality of filters. The profile module may be configured to receive a profile comprising a plurality of filter equalizing coefficients. The equalizing module may be configured to configure the plurality of filters with the plurality of filter equalizing coefficients from the profile, to receive first and second signals, to adjust the plurality of filters using a first gain, to equalize the first plurality using the plurality of filters of the graphic equalizer, to output the first signal, to adjust the plurality of filters, previously configured with the filter equalizing coefficients from the profile, using a second gain, to equalize the second signal using the plurality of filters of the graphic equalizer, and to output the second signal.

In various embodiments, a method comprises configuring a graphic equalizer with a plurality of filter equalizing coefficients, adjusting the graphic equalizer using a first gain, processing the first signal with the graphic equalizer, outputting the first signal from the graphic equalizer, adjusting the graphic equalizer using a second gain, processing the second signal with the graphic equalizer, the graphic equalizer being previously configured with the plurality of filter equalizing coefficients, and outputting the second signal from the graphic equalizer.

In some embodiments, a computer readable medium may comprise executable instructions. The instructions may be executable by a processor for performing a method. The method may comprise receiving a profile comprising a plurality of filter equalizing coefficients, configuring a plurality of filters of a graphic equalizer using the plurality of filter equalizing coefficients from the profile, receiving a first signal for processing, adjusting the plurality of filters using a first gain, equalizing the first signal using the plurality of filters of the graphic equalizer, outputting the first signal, receiving a second signal for processing, adjusting the plurality of filters, previously configured using the filter coefficients from the profile, using a second gain, equalizing the second plurality of frequencies of the second signal with the plurality of filters of the graphic equalizer, and outputting the second signal.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

In various embodiments, methods and systems for digitally processing a ringtone are described. In some embodiments, a method comprises generating a profile comprising a plurality of filter equalizing coefficients, configuring a plurality of filters of a graphic equalizer using the plurality of filter equalizing coefficients from the profile, receiving a ringtone for processing, adjusting the plurality of filters using a first gain, equalizing the ringtone using the plurality of filters of the graphic equalizer, and outputting the equalized ringtone.

The method may further comprise receiving the profile from a communication network or firmware. The plurality of filters may be configured using the plurality of filter equalizing coefficients to modify the ringtone to clarify a sound of music. The plurality of filters may also be configured using the plurality of filter equalizing coefficients to modify the ringtone to clarify a sound of music in a high noise environment. The plurality of filters may be configured using the plurality of filter equalizing coefficients to modify the ringtone to adjust a sound associated with a media file for a handheld device.

The method may further comprise adjusting a gain of the ringtone, filtering the adjusted ringtone with a low shelf filter, and compressing the filtered ringtone with a compressor. The method may also further comprise, after equalizing the ringtone, compressing the equalized ringtone with a compressor and adjusting the gain of the compressed ringtone.

The method may also comprise filtering the ringtone with a first low filter, filtering the ringtone received from the first low shelf filter with a first high shelf filter prior to compressing the filtered ringtone with a compressor, filtering the ringtone with a second low shelf filter prior to equalizing the ringtone with the graphic equalizer, and filtering the ringtone with a second high shelf filter after the ringtone is filtered with the second low shelf filter.

The plurality of filters of the graphic equalizer may comprise eleven cascading second order filters. Further, the second order filters may be bell filters.

An exemplary system may comprise a graphic equalizer. The graphic equalizer may comprise a filter module, a profile module, and an equalizing module. The filter module may comprise a plurality of filters. The profile module may be configured to receive and/or generate a profile, the profile comprising a plurality of filter equalizing coefficients. The equalizing module may be configured to configure the plurality of filters using the plurality of filter equalizing coefficients from the profile, to receive a ringtone, to adjust the plurality of filters using a first gain, to equalize the ringtone using the plurality of filters of the graphic equalizer, and to output the equalized ringtone.

An exemplary method may comprise generating a profile, the profile comprising a plurality of filter equalizing coefficients, configuring a graphic equalizer using a plurality of filter equalizing coefficients, adjusting the graphic equalizer using a first gain, processing the ringtone with the graphic equalizer, and outputting the processed ringtone from the graphic equalizer.

An exemplary computer readable medium may comprise executable instructions. The instructions may be executable by a processor for performing an exemplary method. The exemplary method may comprise generating a profile comprising a plurality of filter equalizing coefficients, configuring a plurality of filters of a graphic equalizer using the plurality of filter equalizing coefficients from the profile, receiving a ringtone for processing, adjusting the plurality of filters using a first gain, equalizing the ringtone using the plurality of filters of the graphic equalizer, and outputting the equalized ringtone.

BRIEF DESCRIPTION OF THE DRAWINGS

The present invention(s), in accordance with one or more various embodiments, are described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Figure 1:
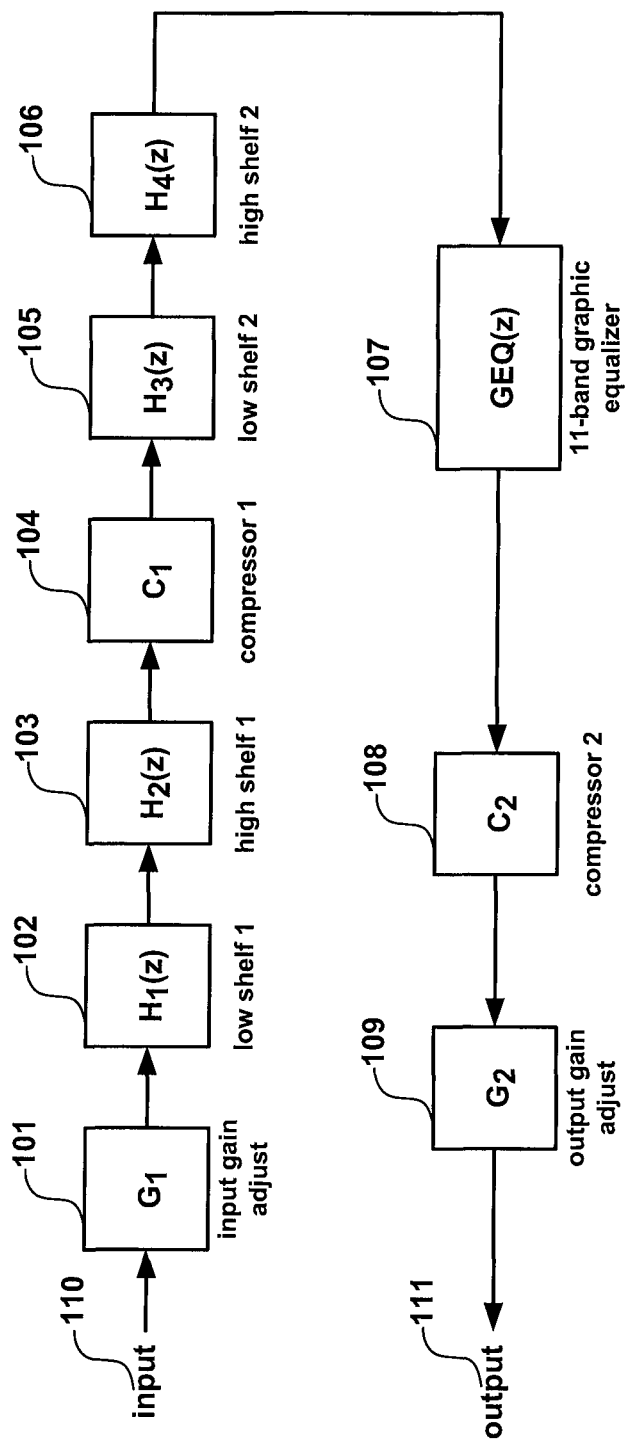
FIG. 1 shows a block diagram of one embodiment of the digital signal processing method of the present invention(s).

The figures are not intended to be exhaustive or to limit the invention to the precise form disclosed. It should be understood that the invention(s) may be practiced with modification and alteration, and that the invention(s) be limited only by the claims and the equivalents thereof.

DETAILED DESCRIPTION

It is to be understood that the present invention(s) are not limited to the particular methodology, compounds, materials, manufacturing techniques, uses, and applications described herein, as these may vary. It is also to be understood that the terminology used herein is used for the purpose of describing particular embodiments only, and is not intended to limit the scope of the present invention(s). It must be noted that as used herein and in the appended embodiments, the singular forms "a," "an," and "the" include the plural reference unless the context clearly dictates otherwise. Thus, for example, a reference to "an audio device" is a reference to one or more audio devices and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention(s). Structures described herein are to be understood also to refer to functional equivalents of such structures.

1.0 Overview

Some background on linear time-invariant systems is helpful. A linear, time-invariant (LTI) discrete-time filter of order N with input x[k] and output y[k] may be described by the following difference equation:

$$y[k]=b_0x[k]+b_1x[k-1]+\ldots+b_Nx[k-N]+a_1y[k-1]+a_2y[k-2]+\ldots+a_Ny[k-N]$$

where the coefficients {b0, b1, . . . , bN, a1, a2, . . . , aN} are chosen so that the filter has the desired characteristics (where the term desired can refer to time-domain behavior or frequency domain behavior).

The difference equation above may be excited by an impulse function, $\delta[k]$, whose value is given by $$\delta[k] = \begin{cases} 1, k = 0 \\ 0, k \neq 0 \end{cases}$$

When the signal $\delta[k]$ is applied to the system described by the above difference equation, the result may be known as the impulse response, h[k]. The impulse response h[k] may characterize the behavior of a LTI discrete-time system for any input signal. That is, if h[k] is known, the output y[k] for an input signal x[k] may be obtained by an operation known as convolution. Formally, given h[k] and x[k], the response y[k] may be computed as $$y[k] = \sum_{n=0}^{\infty} h[n]x[k-n]$$

Some background on the z-transform may also be helpful. The relationship between the time-domain and the frequency-domain may be given by a formula known as the z-transform. The z-transform of a system described by the impulse response h[k] may be defined as the function H(z) where $$H(z) = \sum_{k=0}^{\infty} h[k] z^{-k}$$

and z is a complex variable with both real and imaginary parts. If the complex variable is restricted to the unit circle in the complex plane (i.e., the region described by the relationship [z]=1), what results may be a complex variable that may be described in radial form as $z = e^{j\theta}$, where $0 \le \theta 2\pi$ and $j = \sqrt{-1}$ Some background on the discrete-time fourier transform is also instructive. With z described in radial form, the restriction of the z-transform to the unit circle may be known as the discrete-time Fourier transform (DTFT) and may be given by $$H(e^{j\theta}) = \sum_{k=0}^{\infty} h[k] e^{-jk\theta}$$

Of particular interest is how the system may behave when it is excited by a sinusoid of a given frequency. One of the most significant results from the theory of LTI systems is that sinusoids are eigenfunctions of such systems. This means that the steady-state response of an LTI system to a sinusoid sin(θ0k) may also be sinusoid of the same frequency θ0, differing from the input only in amplitude and phase. In fact, the steady-state output, yss[k] of the LTI system when driven by and input x[k]=sin(θ0k) may be given by $y_{ss}[k] = A \sin(\theta_0 k + \phi_0)$ where $A = |H(e^{j\theta_0})|$ and $\phi_0 = \arg(H(e^{j\theta_0}))$ Finally, some background on frequency response may be helpful. The equations above may be significant because they indicate that the steady-state response of an LTI system when driven by a sinusoid may be a sinusoid of the same frequency, scaled by the magnitude of the DTFT at that frequency and offset in time by the phase of the DTFT at that frequency. What is of concern may be the amplitude of the steady state response, and that the DTFT provides that the relative magnitude of output-to-input when the LTI system may be driven by a sinusoid. Because it is well-known that any input signal may be expressed as a linear combination of sinusoids (the Fourier decomposition theorem), the DTFT may give the response for arbitrary input signals. Qualitatively, the DTFT shows how the system responds to a range of input frequencies, with the plot of the magnitude of the DTFT giving a meaningful measure of how much signal of a given frequency will appear at the system's output. The DTFT is commonly known as the system's frequency response.

2.0 Digital Signal Processing

FIG. 1 illustrates an example digital signal process flow of a method 100 according to one embodiment of the present invention(s). Referring now to FIG. 1, method 100 includes the following steps: input gain adjustment 101, first low shelf filter 102, first high shelf filter 103, first compressor 104, second low shelf filter 105, second high shelf filter 106, graphic equalizer 107, second compressor 108, and output gain adjustment 109.

In one embodiment, digital signal processing method 100 may take as input audio signal 110, perform steps 101-109, and provide output audio signal 111 as output. In some embodiments, digital signal processing method 100 is executable on a computer chip, such as, without limitation, a digital signal processor, or DSP. In various embodiments, such a chip may be one part of a larger audio device, such as, without limitation, a radio, MP3 player, game station, cell phone, television, computer, or public address system. The digital signal processing method 100 may be performed on the audio signal before it is outputted from the audio device. In one such embodiment, digital signal processing method 100 may be performed on the audio signal after it has passed through the source selector, but before it passes through the volume control.

In some embodiments, steps 101-109 may be completed in numerical order, though they may be completed in any other order. In various embodiments, steps 101-109 may exclusively be performed, though in other embodiments, other steps may be performed as well. In some embodiments, each of steps 101-109 may be performed, though in other embodiments, one or more of the steps may be skipped.

In some embodiments, input gain adjustment 101 provides a desired amount of gain in order to bring input audio signal 110 to a level that will prevent digital overflow at subsequent internal points in digital signal processing method 100.

In various embodiments, each of the low-shelf filters 102, 105 is a filter that has a nominal gain of 0 dB for all frequencies above a certain frequency termed the corner frequency. For frequencies below the corner frequency, the low-shelving filter may have a gain of ±G dB, depending on whether the low-shelving filter is in boost or cut mode, respectively. This is shown in FIG. 2.

Figure 2:
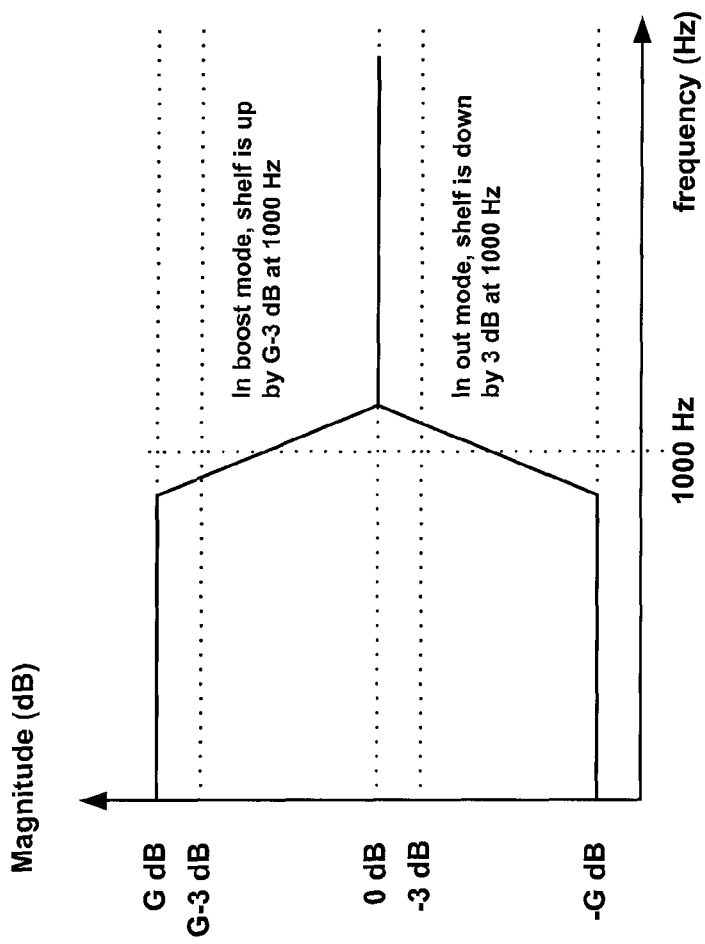
FIG. 2 shows the effect of a low-shelf filter used in one embodiment of the digital signal processing method of the present invention(s).

FIG. 2 illustrates the effect of a low-shelf filter being implemented by one embodiment of the present invention(s). Referring now to FIG. 2, a low-shelving filter may leave all of the frequencies above the corner frequency unaltered, while boosting or cutting all frequencies below the corner frequency by a fixed amount, G dB. Also note that the 0 dB point is slightly higher than the desired 1000 Hz. It may be standard to specify a low-shelving filter in cut mode to have a response that is at −3 dB at the corner frequency, whereas a low-shelving filter in boost mode is specified such that the response at the corner frequency is at G−3 dB (namely, 3 dB down from maximum boost). Indeed, most textbook formulae for creating shelving filters may disclose such responses. This may lead to a certain amount of asymmetry, where for almost all values of boost or cut G, the cut and boost low-shelving filters are not the mirror images of one another.

Figure 3:
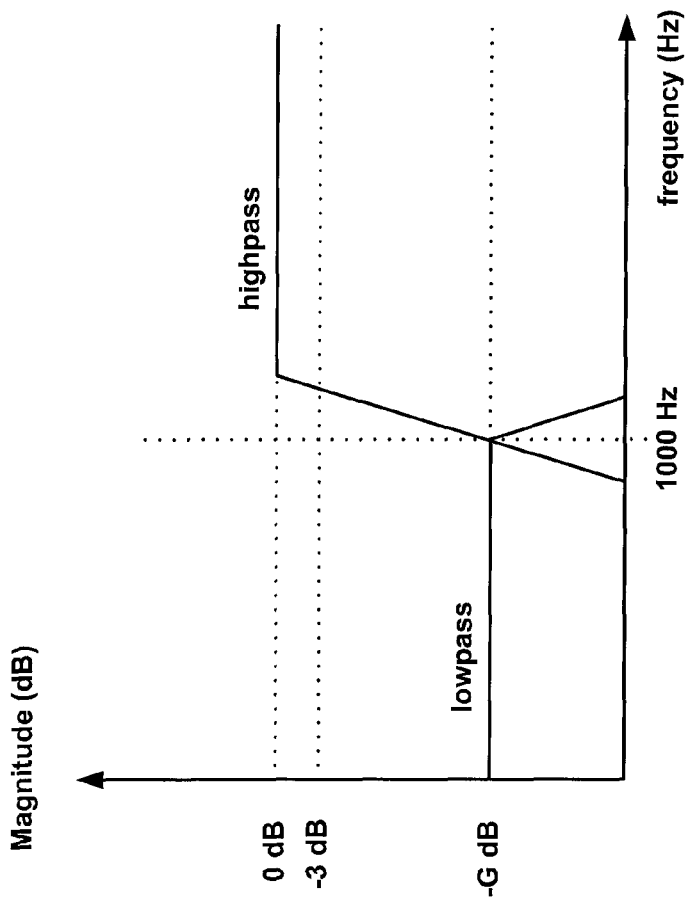
FIG. 3 shows how a low-shelf filter can be created using high-pass and low-pass filters.

Ignoring for now the asymmetry, a standard method for creating a low-shelving filter may be characterized as the weighted sum of highpass and lowpass filters. In one example, a low-shelving filter in cut mode with a gain of −G dB has a corner frequency of 1000 Hz. FIG. 3 shows a highpass filter with a 1000 cutoff frequency and a lowpass filter with a cutoff frequency of 1000 Hz, scaled by −G dB. The aggregate effect of these two filters applied in series may appear as the low-shelving filter in FIG. 2. In practice, there may be some limitations on the steepness of the transition from no boost or cut to G dB of boost or cut. FIG. 3 illustrates this limitation, with the corner frequency shown at 1000 Hz and the desired G dB of boost or cut not being achieved until a particular frequency below 1000 Hz. It should be noted that all of the shelving filters in the present invention(s) are first-order shelving filters, which means they can usually be represented by a first-order rational transfer function:

$$H(z) = \frac{b_0 + b_1 z^{-1}}{1 + a_1 z^{-1}}.$$

Figure 4:
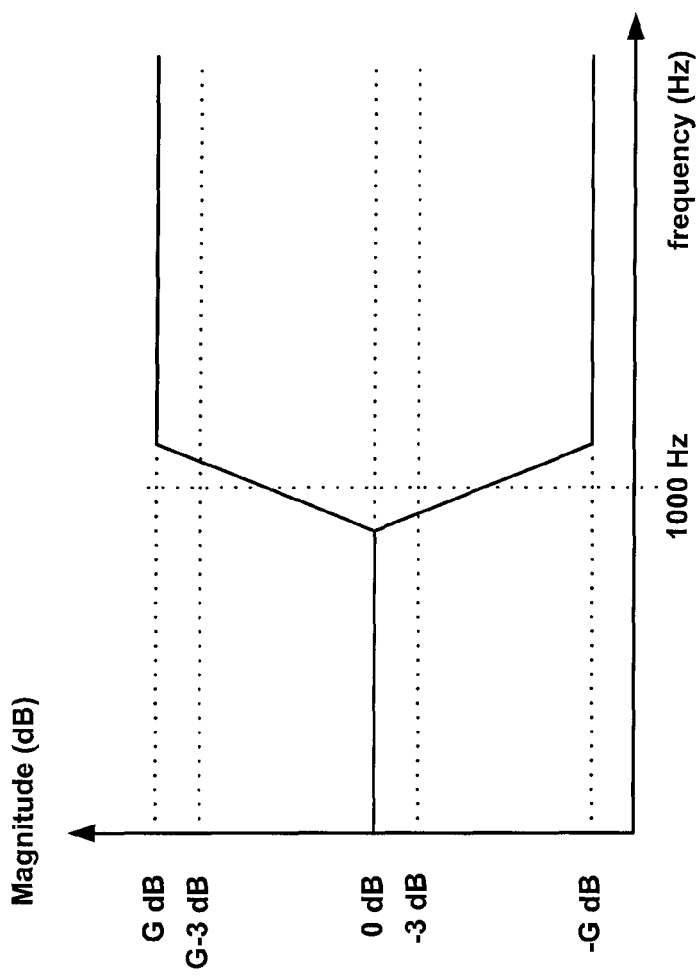
FIG. 4 shows the effect of a high-shelf filter used in one embodiment of the digital signal processing method of the present invention(s).

In some embodiments, each of the high-shelf filters 103, 106 is the mirror image of a low-shelving filter. That is, all frequencies below the corner frequency are left unmodified, whereas the frequencies above the corner frequency are boosted or cut by G dB. The same caveats regarding steepness and asymmetry may apply to the high-shelving filter. FIG. 4 illustrates the effect of a high-shelf filter implemented by an embodiment of the present invention(s). Referring now to FIG. 4, a 1000 Hz high-shelving filter is shown.

Figure 5:
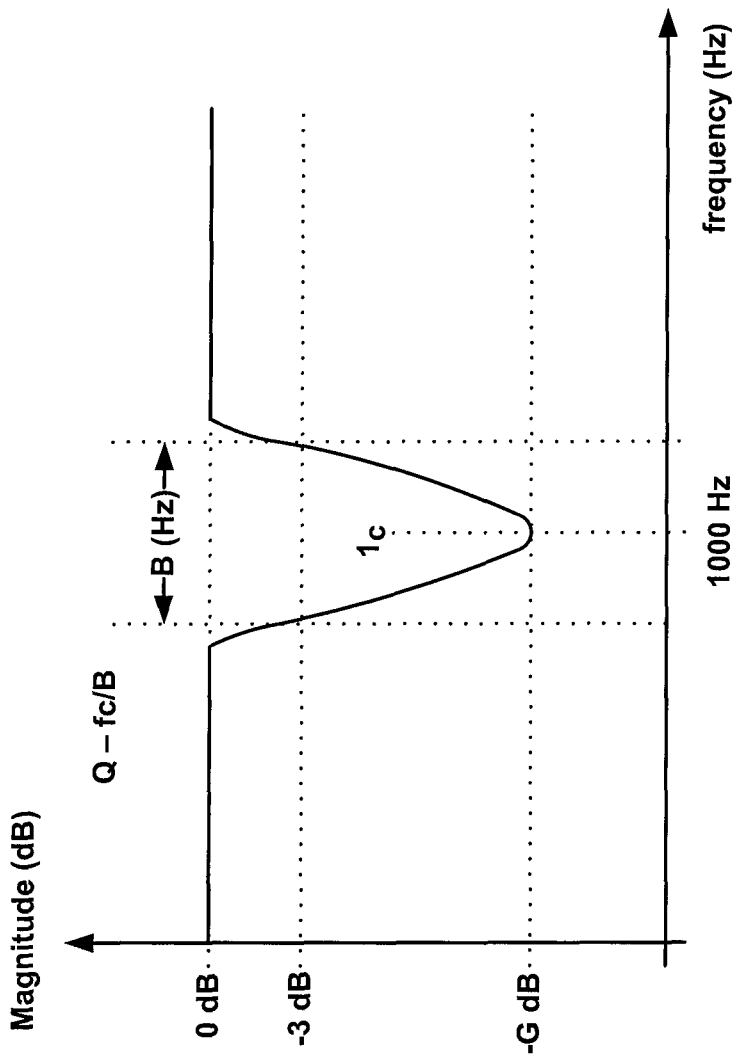
FIG. 5 shows the frequency response of a bell filter used in one embodiment of the digital signal processing method of the present invention(s).

FIG. 5 illustrates an example frequency response of a bell filter implemented by method 100 according to one embodiment of the present invention(s). As shown in FIG. 5, each of the second order filters achieves a bell-shaped boost or cut at a fixed center frequency, with F1(z) centered at 30 Hz, F11(z) centered at 16000 Hz, and the other filters in between centered at roughly one-octave intervals. Referring to FIG. 5, a bell-shaped filter is shown centered at 1000 Hz. The filter has a nominal gain of 0 dB for frequencies above and below the center frequency, 1000 Hz, a gain of –G dB at 1000 Hz, and a bell-shaped response in the region around 1000 Hz.

The shape of the filter may be characterized by a single parameter: the quality factor, Q. The quality factor may be defined as the ratio of the filter's center frequency to its 3-dB bandwidth, B, where the 3-dB bandwidth is illustrated as in the figure: the difference in Hz between the two frequencies at which the filter's response crosses the –3 dB point.

Figure 6:
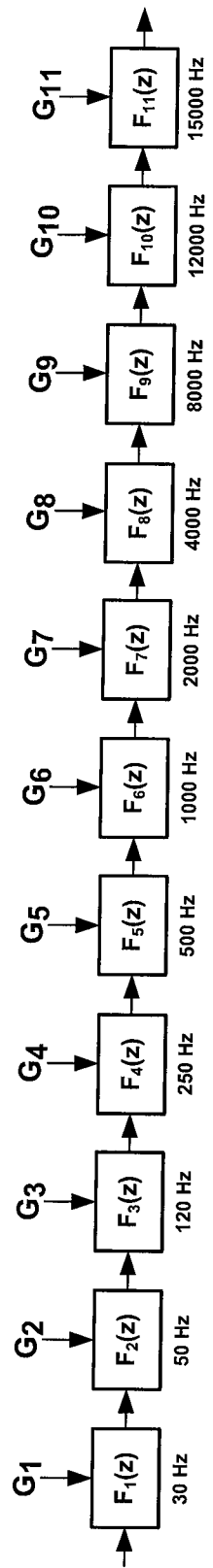
FIG. 6 shows a block diagram of one embodiment of a graphic equalizer used in one embodiment of the digital signal processing method of the present invention(s).

FIG. 6 illustrates an example graphic equalizer block 600 according to one embodiment of the present invention(s). Referring now to FIG. 6, graphic equalizer 600 consists of a cascaded bank of eleven second-order filters, $F_1(z)$, $F_2(z), \ldots, F_{11}(z)$. In one embodiment, graphic equalizer 107 (as shown in FIG. 1) is implemented as graphic equalizer 600.

Each of the eleven second-order filters in the present invention(s) may be computed from formulas that resemble this one:

$$F(z) = \frac{b_0 + b_1 z^{-1} + b_2 z^{-2}}{1 + a_1 z^{-1} + a_2 z^{-2}}.$$

Using such an equation may result in a problem: each of the five coefficients above, $\{b_0, b_1, b_2, a_1, a_2\}$ may depend directly on the quality factor, Q, and the gain, G. This means that for the filter to be tunable, that is, to have variable Q and G, all five coefficients may be recomputed in real-time. This can be problematic, as such calculations may, in some examples, consume the memory available to perform graphic equalizer 107 and create problems of excessive delay or fault, which is unacceptable. In various embodiments, this problem can be avoided by utilizing the Mitra-Regalia Realization.

The theory of digital signal processing (DSP) may be used to implement the filters used in digital signal processing method 100. This theory states that a wide variety of filters (particularly the ones used in digital signal processing method 100) may be decomposed as the weighted sum of an allpass filter and a feedforward branch from the input. Suppose that a second-order transfer function, H(z), is being implements to describes a bell filter centered at fc with quality factor Q and sampling frequency Fs by $$H(z) = \frac{b_0 + b_1 z^{-1} + b_2 z^{-2}}{1 + a_1 z^{-1} + a_2 z^{-2}}.$$

Ancillary quantities k1, k2 can be defined by $$k_1 = \frac{1 - \tan\left(\frac{\pi f_c}{QF_s}\right)}{1 + \tan\left(\frac{\pi f_c}{QF_s}\right)}$$

$$k_2 = -\cos(2\pi f_c / F_s)$$

and transfer function, A(z) can be defined by $$A(z) = \frac{k_2 + k_1(1 + k_2)z^{-1} + z^{-2}}{1 + k_1(1 + k_2)z^{-1} + k_2 z^{-2}}$$

A(z) can be verified to be an allpass filter. This means that the amplitude of A(z) may be constant for all frequencies, with only the phase changing as a function of frequency. A(z) may be used as a building block for each bell-shaped filter. The following result may be shown:

$$H(z) = \frac{1}{2}(1 + G)A(z) + \frac{1}{2}(1 - G)$$

Figure 7:
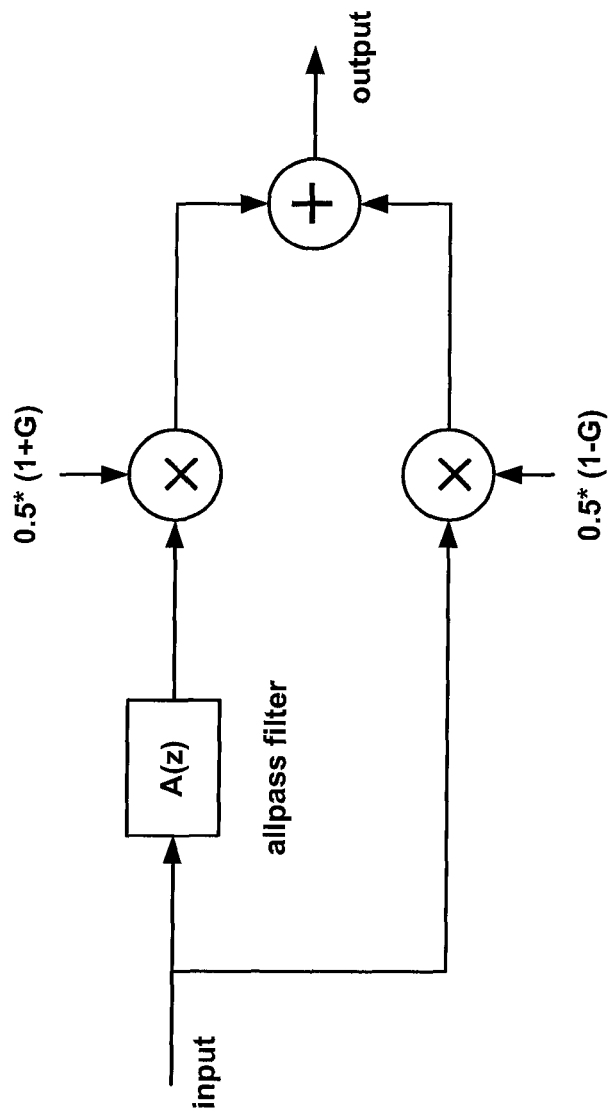
FIG. 7 shows a block diagram showing how a filter can be constructed using the Mitra-Regalia realization.

In various embodiments, this is the crux of the Mitra-Regalia realization. A bell filter with tunable gain may be implemented to show the inclusion of the gain G in a very explicit way. This is illustrated in FIG. 7, which illustrates an example filter constructed using the Mitra-Regalia realization according to one embodiment of the present invention(s).

The filter may be decomposed in a non-intuitive manner. Referring to the above equation, the a and b coefficients may be re-computed whenever G gets changed (i.e., whenever one of the graphic EQ "slider" is moved). The calculations for the a and b coefficients may not be practical to recompute in real time due to complexity. However, in a typical graphic EQ, the gain G and quality factor Q may remain constant and only G may be allowed to vary. From the above equations, A(z) may not depend in any way on the gain, G and that if Q and the center-frequency fc remain fixed (as they do in a graphic EQ filter), then k1 and k2 may remain fixed regardless of G. Thus, in various embodiments, these variables may need to be computed only once. Computing the gain variable may be accomplished by varying a couple of simple quantities in real time:

$$\frac{1}{2}(1 + G)$$

and $$\frac{1}{2}(1 - G).$$

These may be simple computations and only require a couple of CPU cycles. This may leaves only the question of how to implement the allpass transfer function, A(z). The entire graphic equalizer bank may thus consists of 11 cascaded bell filters, each of which is implemented via its own Mitra-Regalia realization:

$$F_1(z) \to \text{fixed } k_1^1, k_2^2, \text{variable } G_1$$

$$F_1(z) \to \text{fixed } k_1^2, k_2^2, \text{variable } G_2$$

$$\vdots \qquad \vdots$$

$$F_{11}(z) \to \text{fixed } k_1^{11}, k_2^{11}, \text{variable } G_{11}$$

It can be seen from that equation that the entire graphic equalizer bank may depend on a total of 22 fixed coefficients that may need to be calculated only once and stored in memory. The "tuning" of the graphic equalizer may be accomplished by adjusting the parameters G1, G2, ..., G11. (e.g., FIG. 6 displays this in schematic form). In some embodiments, the Mitra-Regalia realization may be used over and over in the implementation of the various filters used in digital signal processing method 100. Mitra-Regalia may also implement the shelving filters, where the shelving filters use first-order filter. The net result is that a shelving filter may be characterized by a single allpass parameter, k, and a gain, G. As with the bell filters, the shelving filters may be at fixed corner frequencies (in fact, all of them have 1 kHz as their corner frequency) and the bandwidth may be also fixed. All told, four shelving filters are completely described simply by $$H_1(z) \to \text{fixed } k^1, \text{variable } G_1$$

$$H_2(z) \to \text{fixed } k^2, \text{variable } G_2$$

$$H_3(Z) \to \text{fixed } k^3, \text{variable } G_3$$

$$H_4(Z) \to \text{fixed } k^4, \text{variable } G_4$$

Figure 8:
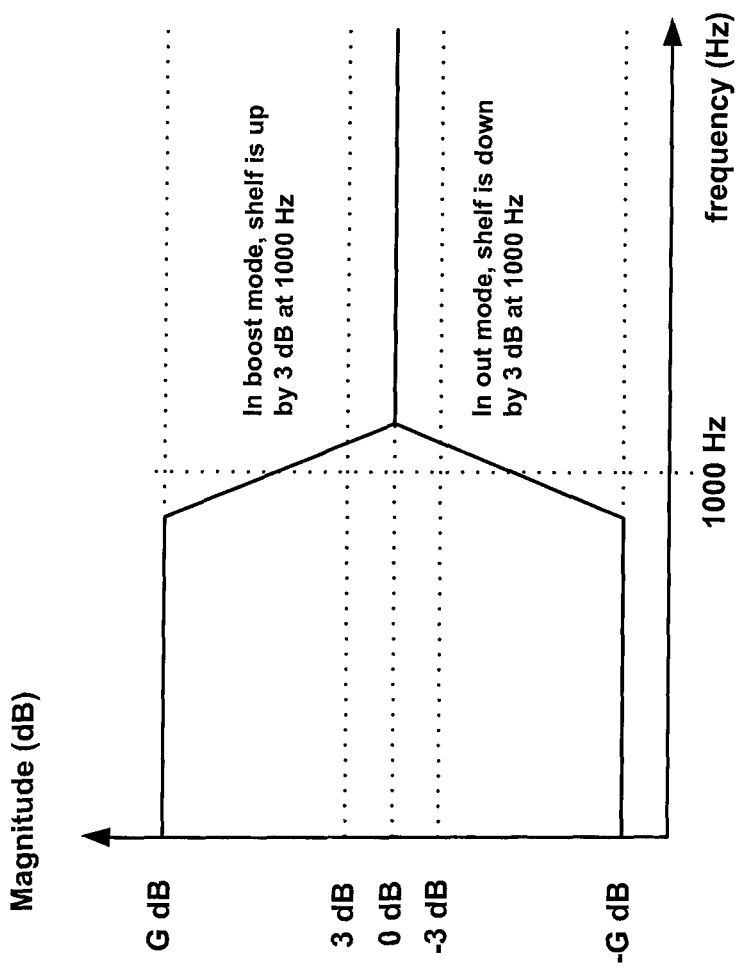
FIG. 8 shows the effect of magnitude-complementary low-shelf filters that may be used in one embodiment of the digital signal processing method of the present invention(s).

As discussed above, an asymmetry in the response of a conventional shelving filter may occur when the filter is boosting versus when the filter is cutting. This may be due, as discussed, to the design technique having different definitions for the 3-dB point when boosting than when cutting. Digital signal processing method 100 may rely on the filters H1(z) and H3(z) being the mirror images of one another and the same holds for H2(z) and H4(z). This may lead to the use of a special filter structure for the boosting shelving filters, one that leads to perfect magnitude cancellation for H1,H3 and H2,H4, as shown in FIG. 8. This type of frequency response may be known as magnitude complementary. This structure may be unique to the present invention(s). In various embodiments, for any filter H(z), a filter with complementary magnitude response may be derived. The filter H−1(z), however, may not be stable or an implementable function of z. This may be the case with a conventional shelving filter. The equations above shows how to make a bell filter from an allpass filter. These equations may apply equally well to constructing a shelving filter beginning with a first-order allpass filter, A(z), where $$A(z) = \frac{\alpha - z^{-1}}{1 - \alpha z^{-1}}$$

and α is chosen such that $$\alpha = \frac{\left(1 - \sin\left(\frac{2\pi f_c}{F_s}\right)\right)}{\cos\left(\frac{2\pi f_c}{F_s}\right)}$$

where fc is the desired corner frequency and Fs is the sampling frequency. Applying the above equations and re-arranging terms, this may be expressed as $$H(z) = \frac{1+G}{2}\left\{1 + \frac{1-G}{1+G}A(z)\right\}.$$

This may be the equation for a low-shelving filter. (A high-shelving filter can be obtained by changing the term (1−G) to (G−1)). Taking the inverse of H(z) may result in the following:

$$\frac{1}{H(z)} = \frac{2}{(1+G)\left(1 + \frac{1-G}{1+G}A(z)\right)}.$$

This equation may be problematic because the equation contains a delay-free loop, which means that the equation may not be implemented via conventional state-variable methods. Fortunately, recent results from system theory may show how to implement rational functions with delay-free loops. Fontana and Karjalainen show that each step may be "split" in time into two "sub-steps."

Figure 9:
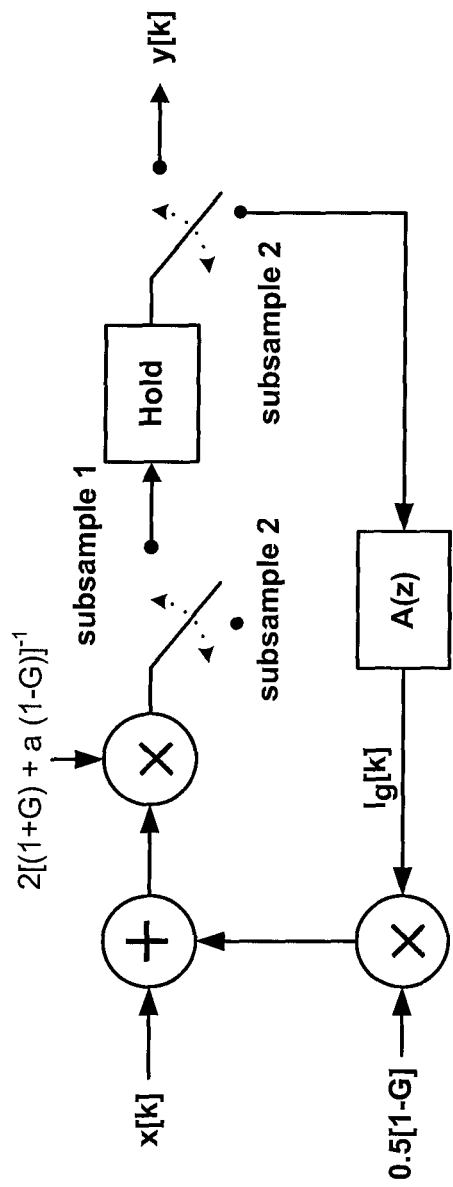
FIG. 9 shows a block diagram of an implementation of a magnitude-complementary low-shelf filter that may be used in one embodiment of the digital signal processing method of the present invention(s).

FIG. 9 illustrates an example magnitude-complementary low-shelf filter according to one embodiment of the present invention(s). Referring to FIG. 9, during the first sub-step (labeled "subsample 1"), feed filter A(z) with zero input and compute its output, 10[k]. During this subsample, the output y[k] may be computed using the value of 10[k], which from the equation immediately above may be performed as follows:

$$y[k] = \frac{1}{1 + a\frac{1-G}{1+G}}\left\{\frac{2}{1+G}x[k] + \frac{1-G}{1+G}l_0[k]\right\}$$

$$= \frac{2}{(1+G) + \alpha(1-G)}\left\{x[k] + \frac{1-G}{2}l_0[k]\right\}$$

It may be seen from FIG. 9 that these two calculations correspond to the case where the switches are in the "subsample 1" position. Next, the switches are thrown to the "subsample 2" position and the only thing which may be left is to update the internal state of the filter A(z). This unconventional filter structure may result in perfect magnitude complementarity, 11. This may be exploited for the present invention(s) in the following manner: when the shelving filters of digital signal processing method 100 are in "cut" mode, the following equation may be used:

$$H(z) = \frac{1+G}{2}\left\{1 + \frac{1-G}{1+G}A(z)\right\}.$$

However, when the shelving filters of digital signal processing method 100 are in "boost" mode, the following equation may be used with the same value of G as used in "cut" mode:

$$y[k] = \frac{1}{1 + a\frac{1-G}{1+G}}\left\{\frac{2}{1+G}x[k] + \frac{1-G}{1+G}l_0[k]\right\}$$

$$= \frac{2}{(1+G) + \alpha(1-G)} \left\{ x[k] + \frac{1-G}{2} l_0[k] \right\}$$

This may result in shelving filters that are mirror images of on another, as per FIG. 8, which is what may be needed for digital signal processing method 100. (Note: Equation 16 can be changed to make a high-shelving filter by changing the sign on the (1−G)/2 term). FIG. 8 illustrates the effect of a magnitude-complementary low-shelf filter implemented by an embodiment of the present invention(s).

Figure 10:
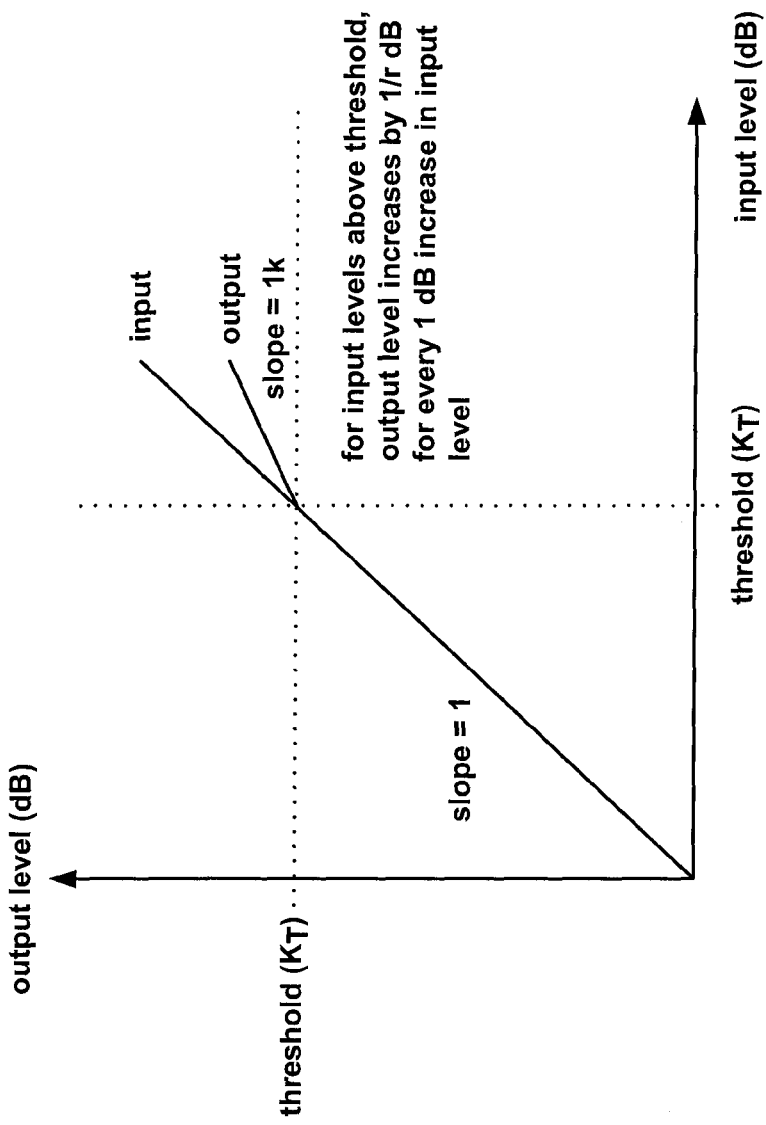
FIG. 10 shows the static transfer characteristic (the relationship between output and input levels) of a compressor used in one embodiment of the digital signal processing method of the present invention(s).

Each of the compressors 104, 108 may be a dynamic range compressor designed to alter the dynamic range of a signal by reducing the ratio between the signal's peak level and its average level. A compressor may be characterized by four quantities: the attack time, Tatt, the release time, Trel, the threshold, KT, and the ratio, r. In brief, the envelope of the signal may be tracked by an algorithm that gives a rough "outline" of the signal's level. Once that level surpasses the threshold, KT, for a period of time equal to Tat, the compressor may decrease the level of the signal by the ratio r dB for every dB above KT. Once the envelope of the signal falls below KT for a period equal to the release time, Trel, the compressor may stop decreasing the level. FIG. 10 may illustrate a static transfer characteristic (relationship between output and input levels) of a compressor implemented in accordance to one embodiment of the present invention(s).

It may be instructive to examine closely the static transfer characteristic. Assume that the signal's level, L[k] at instant k has been computed. For instructive purposes, a one single static level, L, will be considered. If L is below the compressor's trigger threshold, KT, the compressor may do nothing and allow the signal through unchanged. If, however, L is greater than KT, the compressor may attenuate the input signal by r dB for every dB by which the level L exceeds KT.

It may be instructive to consider an instance where L may be greater than KT, which means that $20 \log_{10}(L) > 20 \log_{10}(KT)$. In such an instance, the excess gain, i.e., the amount in dB by which the level exceeds the threshold, may be: $g_{excess} = 20 \log_{10}(L) - 20 \log_{10}(KT)$. As the compressor attenuates the input by r dB for every dB of excess gain, the gain reduction, gR, may be expressed as $$g_R = \frac{g_{excess}}{R} = \frac{1}{R} \cdot (20\log_{10}(L) - 20\log_{10}(K_T))$$

From that, it may follow that that with the output of the compressor, y given by $20 \log_{10}(y) = gR * 20 \log_{10}(x)$, that the desired output-to-input relationship may be satisfied.

Conversion of this equation to the linear, as opposed to the logarithmic, domain may yield the following:

$$y = (10^{\log_{10}(x)})^{\frac{1}{R}(\log_{10}(L) - \log_{10}(K_T))}$$

Which may be equivalent to:

$$y = x^{\frac{1}{R}(\log_{10}(L) - \log_{10}(K_T))} = x^{\frac{1}{R}(\log_{10}(L/K_T))}$$

A meaningful estimate of the signal's level may be accomplished in a fairly straightforward way: a running "integration" of the signal's absolute value may be kept, where the rate at which the level is integrated may be determined by the desired attack time. When the instantaneous level of the signal drops below the present integrated level, the integrated level may be allowed to drop at a rate determined by the release time. Given attack and release times Tatt and Trel, the equation used to keep track of the level, L[k] may be given by $$L[k] = \begin{cases} (1 - \alpha_{att})|x[k]| + \alpha_{att}L[k-1]| & \text{for } |x[k]| \geq L[k-1] \\ (1 - \alpha_{rel})|x[k]| + \alpha_{rel}L[k-1]| & \text{for } |x[k]| < L[k-1] \end{cases}$$

where $$\alpha_{att} = \exp\left(\frac{1}{F_8 T_{att}}\right)$$

and $$\alpha_{rel} = \exp\left(\frac{1}{5 F_8 T_{rel}}\right)$$

In some embodiments, at every point of the level calculation as described above, L[k] as computed, may be compared to the threshold KT. If L[k] is greater than KT, the input signal, x[k], is scaled by an amount that is proportional to the amount by which the level exceeds the threshold. The constant of proportionality may be equal to the compressor ratio, r. The following relationship between the input and the output of the compressor may be established:

With the level L[k] as computed in Equation 18, the quantity Gexcess may be computed as $$G_{excess} = L[k] K_T^{-1},$$

which may be represented the amount of excess gain. If the excess gain is less than one, the input signal is not changed and passed through to the output. In the event that the excess gain exceeds one, the gain reduction, GR may be computed by:

$$G_R = (G_{excess})^{\frac{1-r}{r}} = (L[k]K_T^{-1})^{\frac{1-r}{r}}$$

and then the input signal may be scaled by GR and sent to the output:

output[k]=G_R x[k].

Through this procedure, an output signal whose level increases by 1/r dB for every 1 dB may increase in the input signal's level is created.

In practice, computing the inverse $K_T^{-1}$ for the above equations may be time consuming, as certain computer chips may be very bad at division in real-time. As KT is known in advance and it only changes when the user changes it, a pre-computed table of $K_T^{-1}$ values can be stored in memory and used as needed. Similarly, the exponentiation operation in the above equation calculating GR may be extremely difficult to perform in real time, so pre-computed values may be used as an approximation. Since quantity GR may be only of concern when Gexcess is greater than unity, a list of, say, 100 values of GR, pre-computed at integer values of GR from GR=1 to GR=100 may be created for every possible value of ratio r. For non-integer values of GR (almost all of them), the quantity in the above equation calculating GR may be approximated in the following way. Let interp be the amount by which Gexcess exceeds the nearest integral value of Gexcess. In other words, interp=G_{excess excess}−⌊(G_{excuse})⌋ and let GR,0 and GR,1 refer to the pre-computed values $$G_{R,0} = \lfloor (G_{excess}) \rfloor^{\frac{1-r}{r}}$$

and $$G_{R,1} = \lfloor (1 + G_{excess}) \rfloor^{\frac{1-r}{r}}.$$

Linear interpolation may then be used to compute an approximation of GR as follows:

$$G_R \approx G_{R,0} + \text{interp} * (G_{R,1} - G_{R,0})$$

The error between the true value of GR and the approximation in the above equation may be shown to be insignificant for the purposes of the present invention(s). Furthermore, in some embodiments, the computation of the approximate value of GR may require only a few arithmetic cycles and several reads from precomputed tables. In one embodiment, tables for six different values of ratio, r, and for 100 integral points of Gexcess may be stored in memory. In such an embodiment, the entire memory usage is only 600 words of memory, which may be much more palatable than the many hundred cycles of computation that may be necessary to calculate the true value of GR directly. This, in some embodiments, may be a major advantage of the present invention.

Each of the digital filters in digital signal processing method 100 may be implemented using any one a variety of potential architectures or realizations, each of which has its trade-offs in terms of complexity, speed of throughput, coefficient sensitivity, stability, fixedpoint behavior, and other numerical considerations. In a specific embodiment, a simple architecture known as a direct-form architecture of type 1 (DF1) may be used. The DF1 architecture has a number of desirable properties, not the least of which is its clear correspondence to the difference equation and the transfer function of the filter in question. All of the digital filters in digital signal processing method 100 are of either first or second order.

The second-order filter will be examined in detail first. As discussed above, the transfer function implemented in the second-order filter is given by $$H(z) = \frac{b_0 + b_1 z^{-1} + b_2 z^{-2}}{1 + a_1 z^{-1} + a_2 z^{-2}},$$

which corresponds to the difference equation $$y[k] = b_0 x[k] + b_1 x[k-1] + b_2 x[k-2] - a_1 y[k-1] - a_2 y[k-2].$$

Figure 11:
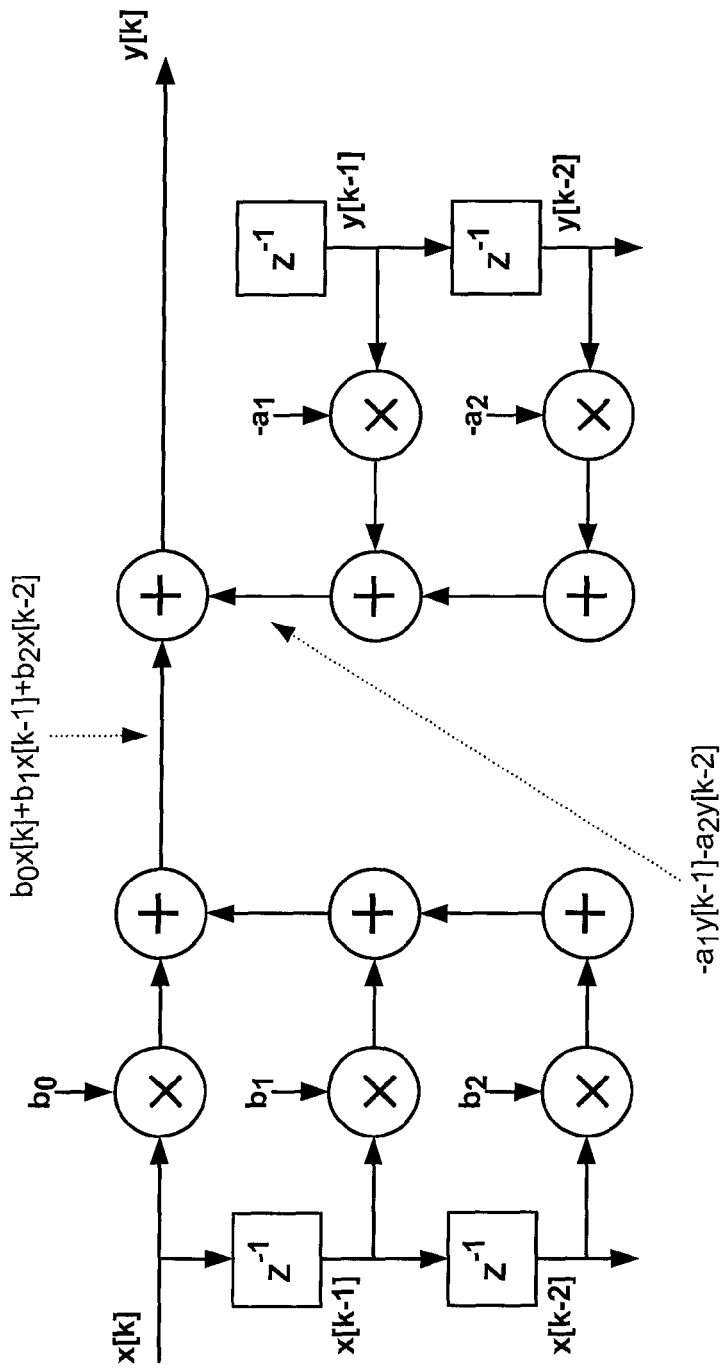
FIG. 11 shows a block diagram of a direct form type 1 implementation of second order transfer function used in one embodiment of the digital signal processing method of the present invention(s).

FIG. 11 illustrates the DF1 architecture for a second-order filter according to one embodiment of the present invention(s). As shown in FIG. 11, the multiplier coefficients in this filter structure may correspond to the coefficients in the transfer function and in the difference equation above. The blocks marked with the symbol z-1 may be delay registers, the outputs of which may be required at every step of the computation. The outputs of these registers may be termed state variables and memory may be allocated for them in some embodiments of digital signal processing method 100. The output of the digital filter may be computed as follows:

Initially, every one of the state variables may be set to zero. In other words, $$x[-1] = x[-2] = y[-1] = y[-2] = 0.$$

At time k=0 the following computation may be done, according to FIG. 11:

$$y[0] = b_0 x[0] + b_1 x[-1] + b_2 x[-2] - a_1 y[-1] - a_2 y[-2].$$

Then, the registers are then updated so that the register marked by x[k−1] now holds x[0], the register marked by x[k−2] now holds x[−1], the register marked by y[k−1] holds y[0], and the register marked by y[k−2] holds y[−1].

At time k=1 the following computation may be done:

$$y[1] = b_0 x[1] + b_1 x[0] + b_2 x[-1] - a_1 y[0] - a_2 A[-1]$$

Then, the register update may again be completed so that the register marked by x[k−1] may holds x[1], the register marked by x[k−2] may holds x[0], the register marked by y[k−1] holds y[1], and the register marked by y[k−2] may holds y[0].

This process may then be repeated over and over for all instants k: A new input, x[k], is brought in, a new output y[k] is computed, and the state variables are updated.

In general, then, the digital filtering operation can be viewed as a set of multiplications and additions performed on a data stream x[0], x[1], x[2], ... using the coefficients b0, b1, b2, a1, a2 and the state variables x[k−1], x[k−2], y[k−1], y[k−2].

The manifestation of this in specific situations may be instructive. Examination of the bell filter that constitutes the fundamental building-block of graphic equalizer 107 may be helpful. As discussed above, the bell filter is implemented with a sampling frequency Fs, gain G at a center frequency fc, and quality factor Q as $$H(z) = \frac{1}{2}(1+G)A(z) + \frac{1}{2}(1-G)$$

where A(z) is an allpass filter defined by $$A(z) = \frac{k_2 + k_1(1+k_2)z^{-1} + z^{-2}}{1 + k_1(1+k_2)z^{-1} + k_2 z^{-2}}$$

where k1 and k2 are computed from fc and Q via the equations $$k_1 = \frac{1 - \tan\left(\frac{\pi f_c}{QF_s}\right)}{1 + \tan\left(\frac{\pi f_c}{QF_s}\right)}$$

and $$k_2 = -\cos(2\pi f_c / F_s)$$

The values k1 and k2 may be pre-computed and stored in a table in memory. To implement a filter for specific values of Q and fc, the corresponding values of k1 and k2 may be looked up in this table. Since there are eleven specific values of fc and sixteen specific values of Q in the algorithm, and the filter operates at a single sampling frequency, Fs, and only k2 may depend on both fc and Q, the overall storage requirements for the k1 and k2 coefficient set may be quite small (11×16×2 words at worst).

Observe from the equation above for A(z) that its coefficients are symmetric. That is, the equations may be re-written as $$A(z) = \frac{z^{-2} + geq\_b1z^{-1} + geq\_b0}{1 + geq\_b1z^{-1} + geq\_b0z^{-2}}$$

where $geq\_b0 = k_2$ and $geq\_b1 = k_1(1+k_2)$.

Observe that A(z) as given in the above equation implies the difference equation $y[k]=geq\_b0x[k]+geq\_b1x[k-1]+x[k-2]-geq\_b1y[k-1]-geq\_b0y[k-2]$, which can be rearranged to yield $y[k]=geq\_b0(x[k]-y[k-2])+geq\_b0(x[k-1]-y[k-1])+x[k-2]$ In a specific embodiment, the state variables may be stored in arrays xv[ ] and yv[ ] with xv[0] corresponding to x[k−2], xv[1] corresponding to x[k−1], yv[0] corresponding to y[k−2] and yv[1] corresponding to y[k−1]. Then the following code-snippet implements a single step of the allpass filter:

```
void allpass(float *xv, float *yv, float *input, float *output)
{
    *output = geq_b0 * (*input - yv[0]) + geq_b1 * (xv[1] -
        yv[1]) + xv[0]
    xv[0] = xv[1]; \\ update
    xv[1] = *input; \\ update
    yv[0] = yv[1]; \\update
    yv[1] = *output; \\update
}
```

Now the loop may be incorporated around the allpass filter as per the equations above. This is realized by the following:

```
void bell(float *xv, float *yv, float gain, float *input, float *output)
{
    allpass(xv, yv, input, output);
    *output = 0.5 * (1.0-gain) * (*output) + 0.5 * (1.0+gain) * (*input);
}
```

More concisely, the previous two code snippets can be combined into a single routine that looks like this:

```
void bell(float *xv, float *yv, float gain, float *input, float *output)
{
    float ap_output = geq_b0 * (*input - yv[0])
        + geq_b1 * (xv[1] - yv[1]) + xv[0]
    xv[0] = xv[1]; \\ update
    xv[1] = *input; \\ update
    yv[0] = yv[1]; \\update
    yv[1] = *output; \\update
    *output = 0.5 * (1.0-gain) * ap_output + 0.5 * (1.0+gain) * (*input);
}
```

The first-order filter will now be examined in detail. These filters may be described by the transfer function $$H(z) = \frac{b_0 + b_1 z^{-1}}{1 + a_1 z^{-1}},$$

which corresponds to the difference equation $y[k]=b_0 x[k]+b_1 x[k-1]-a_1 y[k-1]$.

Figure 12:
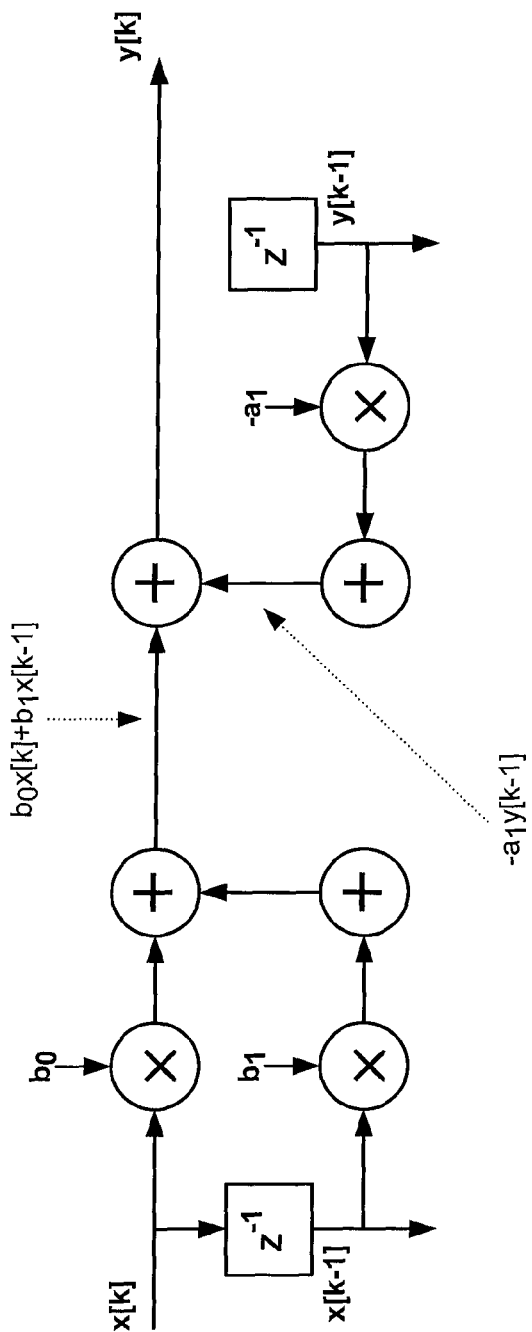
FIG. 12 shows a block diagram of a direct form type 1 implementation of second order transfer function used in one embodiment of the digital signal processing method of the present invention(s).

FIG. 12 illustrates the DF1 architecture for a first-order filter according to one embodiment of the present invention(s). Referring now to FIG. 12, the multiplier coefficients in this filter structure may correspond in a clear way to the coefficients in the transfer function and in the difference equation. The output of the digital filter may be computed as follows:

Initially, every one of the state variables may be set to zero. In other words, $x[-1]=y[-1]=0$.

At time k=0 the following computation may be done, according to FIG. 11:

$y[0]=b_0 x[0]+b_1 x[-1]-a_1 y[-1]$.

Then, the registers may then be updated so that the register marked by x[k−1] now holds x[0], and the register marked by y[k−1] holds y[0].

At time k=1 the following computation may be done:

$y[1]=b_0 x[1]+b_1 x[0]-a_1 y[0]$

Then, the register update may again be completed so that the register marked by x[k−1] now holds x[1] and the register marked by y[k−1] holds y[1].

This process may then be repeated over and over for all instants k: A new input, x[k], is brought in, a new output y[k] may be computed, and the state variables are updated.

In general, then, the digital filtering operation may be viewed as a set of multiplications and additions performed on a data stream x[0], x[1], x[2], . . . using the coefficients b0, b1, a1 and the state variables x[k−1], y[k−1].

Figure 13:
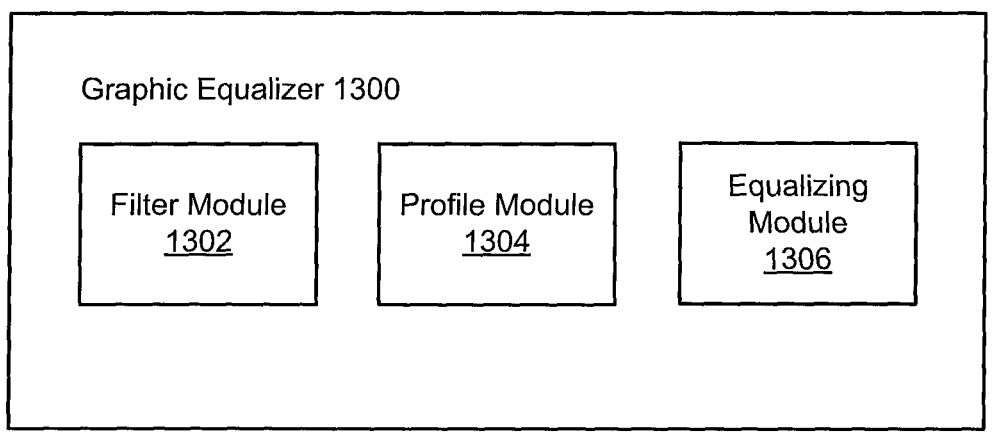
FIG. 13 is a block diagram of a graphic equalizer used in one embodiment of the digital signal processing method of the present invention(s).

FIG. 13 is a block diagram of a graphic equalizer 1300 used in one embodiment of the digital signal processing method of the present invention(s). In various embodiments, a profile may comprise a plurality of filter equalizing coefficients which may be used to configure the graphic equalizer 1300. As discussed herein, once configured by the plurality of filter equalizing coefficients (e.g., coefficient modifiers), the graphic equalizer 1300 may equalize a plurality of signals. Although adjustments to the filters of the graphic equalizer 1300 may be performed (e.g., using a desired gain value), the filters may not need to be reconfigured with a different set of filter equalizing coefficients while equalizing a plurality of signals.

In various embodiments, the graphic equalizer 1300 comprises a filter module 1302, a profile module 1304, and an equalizing module 1306. The graphic equalizer 1300 may comprise the 11-band graphic equalizer 107. Those skilled in the art will appreciate that the graphic equalizer 1300 may comprise any number of bands.

The filter module 1302 comprises any number of filters. In various embodiments, the filters of the plurality of the filters in the filter module 1302 are in parallel with each other. One or more of the filters of the plurality of filters may be configured to filter a signal at a different frequency. In some embodiments, the filters of the plurality of filters are second order bell filters.

The profile module 1304 is configured to receive a profile. A profile comprises a plurality of filter equalizing coefficients (e.g., filter equalizing coefficient modifiers) which may be used to configure the filters of the graphic equalizer (e.g., the filters of the plurality of filters in the filter module 1302). In some embodiments, a profile may be directed to a particular type or model of hardware (e.g., speaker), particular listening environment (e.g., noisy or quiet), and/or audio content (e.g., voice, music, or movie). In some examples of hardware profiles, there may be a profile directed to cellular telephones, wired telephones, cordless telephones, communication devices (e.g., walkie talkies and other two-way radio transceivers), police radios, music players (e.g., Apple IPod and Microsoft Zune), headsets, earpieces, microphones, and/or the like.

For example, when a profile is directed to a particular type or model of hardware, the plurality of filter equalizing coefficients of that profile may configure the graphic equalizer 1300 to equalize one or more signals as to improve quality for that particular type or model of hardware. In one example, a user may select a profile directed at a particular model of PC speakers. The plurality of filter equalizing coefficients of the selected profile may be used to configure the graphic equalizer 1300 to equalize signals that are to be played through the PC speaker such that the perceived quality of the sound through the PC speaker attains a quality that may be higher than if the graphic equalizer 1300 was not so configured.

In another example, the user may select a profile directed to a particular model of microphone. The plurality of filter equalizing coefficients of the selected profile may be used to configure the graphic equalizer 1300 to equalize signals that are received from the microphone such that the perceived quality of the sound may be enhanced.

There may also be profiles directed to one or more listening environments. For example, there may be a profile directed to clarify the sound of a voice during a telephone conversation, to clarify voice or music in high noise environments, and/or to clarify voice or music environments where the listener is hearing impaired. There may also be separate profiles for different audio content including a profile for signals associated with voice, music, and movies. In one example, there may be different profiles for different types of music (e.g., alternative music, jazz, or classical).

Those skilled in the art will appreciate that the enhancement or clarification of sound may refer to an improved perception of the sound. In various embodiments, the filter equalizing coefficients of the profile may be selected as to improve the perception of sound for a particular device playing a particular audio content (e.g., a movie over a portable media player). The filter equalizing coefficients of the plurality of filter equalizing coefficients in the profile may be selected and/or generated based on a desired sound output and/or quality.

The equalizing module 1306 may configure the filters of the filter module 1302 using the coefficients of the plurality of filter equalizing coefficients in the profile. As discussed herein, the filters of the graphic equalizer 1300 may be implemented via a Mitra-Regalia realization. In one example, once the equalizing module 1306 configures the filters with the filter equalizing coefficients, the coefficients of the filters may remain fixed (i.e., the filters are not reconfigured with new coefficients before, during, or after equalizing multiple signals). Although the filters of the graphic equalizer 1300 may not be reconfigured with new filter equalizing coefficients, the filters may be periodically adjusted with a gain value (e.g., the gain variable). Computing the gain value to further configure the equalizer filters may be accomplished by varying simple quantities as previously discussed.

The equalizing module 1306 may also equalize multiple signals using the filters configured by the filter equalizing coefficients of the profile. In one example, the equalizing module 1306 equalizes a first signal containing multiple frequencies using the previously configured equalizer filters of the filter module 1306. A second signal may also be similarly equalized using the equalizer filters as previously configured by the filter equalizing coefficients. In some embodiments, the equalizing module 1306 adjusts the gain to further configure the equalizer filters before the second signal is equalized.

In some embodiments, the profile may comprise one or more shelf filter coefficients. As discussed herein, one or more shelf filters may comprise first order filters. The one or more shelf filters (e.g., low shelf 1 102, high shelf 1 103, low shelf 2 105, and high shelf 2 106 of FIG. 1) may be configured by the shelf filter coefficient(s) within the profile. In one example, the profile may be directed to a particular built-in speaker of a particular model of computer. In this example, shelf filter coefficients within the profile may be used to configure the shelf filters to improve or enhance sound quality from the built-in speaker. Those skilled in the art will appreciate that the profile may comprise many different filter coefficients that may be used to configure any filter to improve or enhance sound quality. The shelf filters or any filter may be further configured with the gain value as discussed herein.

Those skilled in the art will appreciate that more or less modules may perform the functions of the modules described in FIG. 13. There may be any number of modules. Modules may comprise hardware, software, or a combination of both. Hardware modules may comprise any form of hardware including circuitry. In some embodiments, filter circuitry performs the same or similar functions as the filter module 1302. Profile circuitry may perform the same or similar functions as the profile module 1304 and equalizing circuitry may perform the same or similar functions as the equalizing module 1306. Software modules may comprise instructions that may be stored within a computer readable medium such as a hard drive, RAM, flash memory, CD, DVD, or the like. The instructions of the software may be executable by a processor to perform a method.

Figure 14:
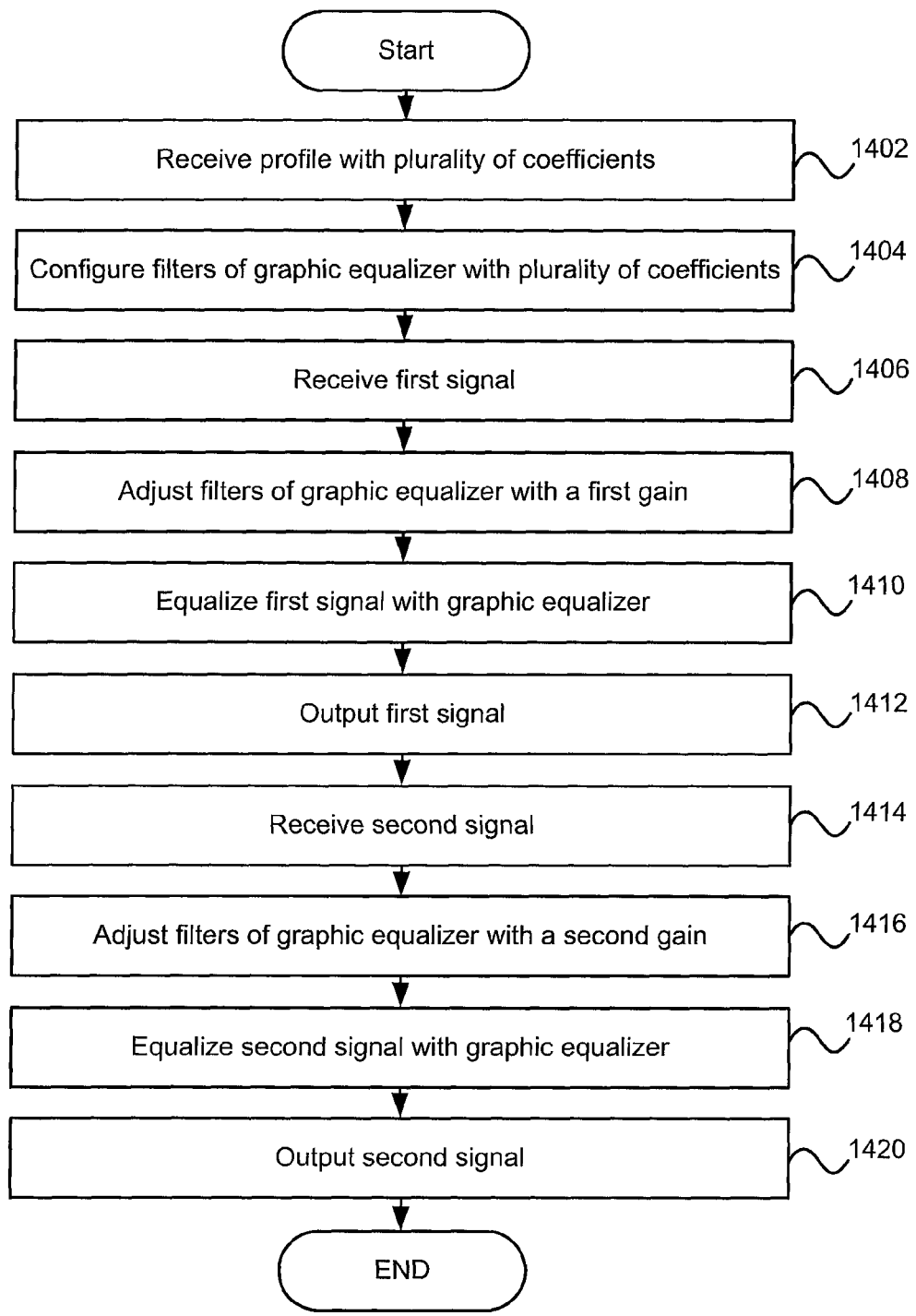
FIG. 14 is a flow chart for configuring a graphic equalizer with a plurality of filter coefficients in one embodiment of the digital signal processing method of the present invention(s).

FIG. 14 is a flow chart for configuring a graphic equalizer 1300 with a plurality of filter equalizing coefficients in one embodiment of the digital signal processing method of the present invention(s). In step 1402, the profile module 1304 receives a profile with a plurality of filter equalizing coefficients. In various embodiments, a user of a digital device may select a profile that is associated with available hardware, listening environment, and/or audio content. A digital device is any device with memory and a processor. In some examples, a digital device may comprise a cellular telephone, a corded telephone, a wireless telephone, a music player, media player, a personal digital assistant, e-book reader, laptop, desk computer or the like.

The profile may be previously stored on the digital device (e.g., within a hard drive, Flash memory, or RAM), retrieved from firmware, or downloaded from a communication network (e.g., the Internet). In some embodiments, different profiles may be available for download. Each profile may be directed to a particular hardware (e.g., model and/or type of speaker or headphone), listening environment (e.g., noisy), and/or audio content (e.g., voice, music, or movies). In one example, one or more profiles may be downloaded from a manufacturer and/or a website.

In step 1404, the equalizing module 1306 configures filters of the graphic equalizer 1300 (e.g., equalizer filters of the filter module 1302) with the plurality of filter equalizing coefficients from the profile. The equalizing module 1306 or another module may also configure one or more other filters with other coefficients contained within the profile.

In step 1406, the equalizing module 1306 receives a first signal. The first signal may comprise a plurality of frequencies to be equalized by the preconfigured equalizer filters of the filter module 1302.

In step 1408, the equalizing module 1306 adjusts filters of the graphic equalizer 1300 (e.g., the filters of the filter module 1302) using a first gain (e.g., a first gain value). In some embodiments, the gain is associated with a speaker. The gain may be associated with the desired characteristic of the sound to be stored. Further, the gain may be associated with the first signal. In some embodiments, the equalizing module 1306 adjusts of the filter module 1302 prior to receiving the first signal.

In step 1410, the equalizing module 1306 equalizes the first signal. In various embodiments, the equalizing module 1306 equalizes the first signal with the equalizer filters of the filter module 1302 that was configured by the filter equalizing coefficients of the profile and further adjusted by the gain.

The equalizing module 1306 may output the first signal in step 1412. In some embodiments, the first signal may be output to a speaker device or storage device. In other embodiments, the first signal may be output for further processing (e.g., by one or more compressors and/or one or more filters).

In step 1414, the equalizing module 1306 receives the second signal. In step 1416, the equalizing module 1306 adjusts filters of the graphic equalizer 1300 with a second gain. In one example, the equalizing module 1306 further adjusts the filters of the filter module 1302 that were previously configured using the filter equalizing coefficients. The second gain may be associated with the first signal, the second signal, a speaker, or a sound characteristic. In some embodiments, this step is optional.

In step 1418, the equalizing module 1306 equalizes the second signal with the graphic equalizer 1300. In various embodiments, the equalizing module 1306 equalizes the second signal with the equalizer filters of the filter module 1302 that was configured by the filter equalizing coefficients of the profile and further adjusted by the first and/or second gain. The equalizing module 1306 may output the second signal in step 1420.

Those skilled in the art will appreciate that different profiles may be applied during signal processing (e.g., while sound is playing through a speaker). In some embodiments, a user may select a first profile containing filter equalizing coefficients which are used to configure the graphic equalizer 1300 during processing. The change or enhancement caused by the signal processing of the configured graphic equalizer 1300 may be perceptible by a listener. The user may also select a second profile containing different filter equalizing coefficients which are used to reconfigure the graphic equalizer 1300. As discussed herein, the change or enhancement caused by the signal processing of the reconfigured graphic equalizer 1300 may also be perceptible by the listener. In various embodiments, a listener (e.g., user) may select a variety of different profiles during signal processing and listen to the differences. As a result, the listener may settle on a preferred profile.

Figure 15:
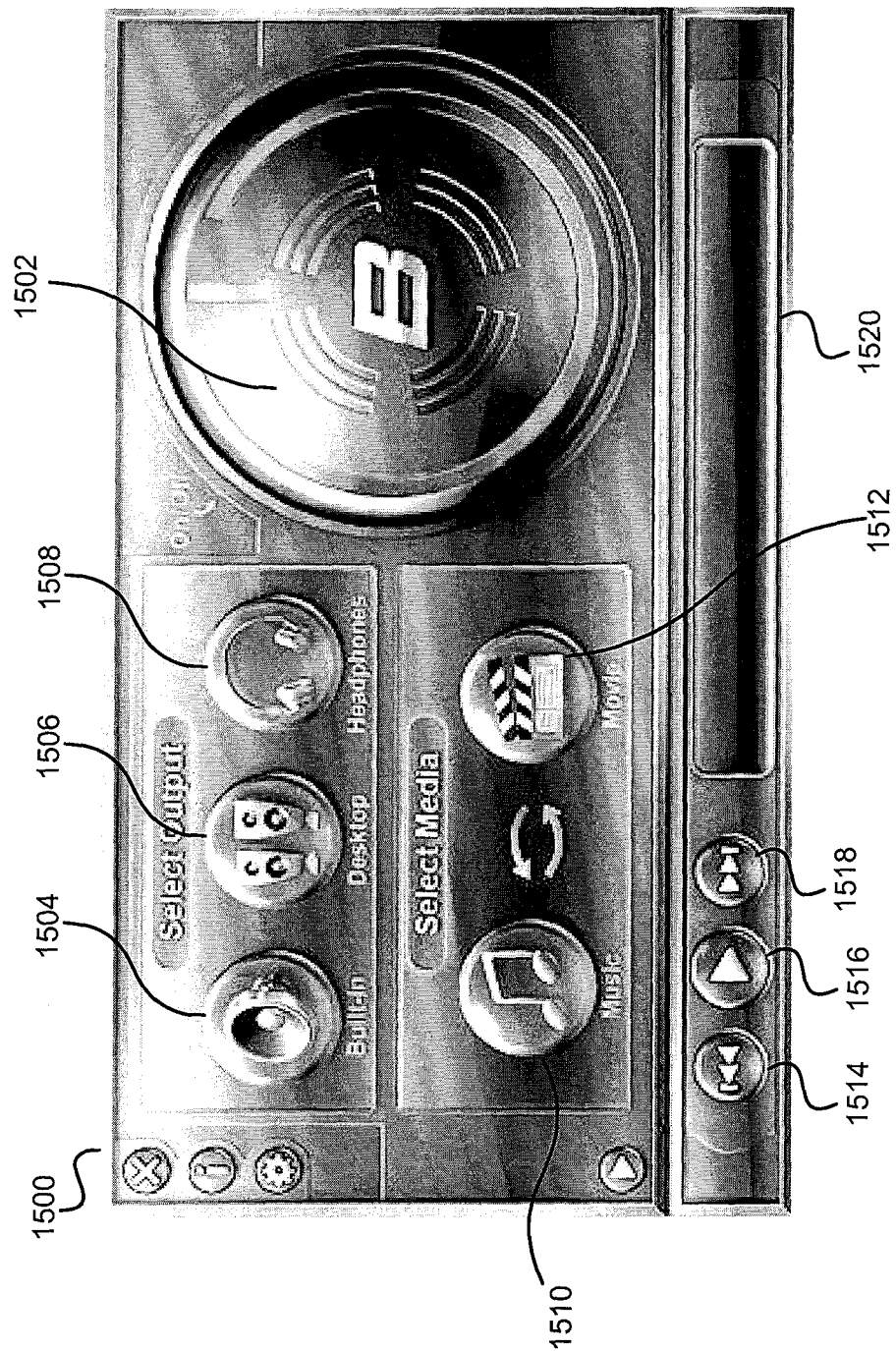
FIG. 15 is an exemplary graphical user interface for selecting one or more profiles to configure the graphic equalizer in one embodiment of the digital signal processing method of the present invention(s).

FIG. 15 is an exemplary graphical user interface 1500 for selecting one or more profiles to configure the graphic equalizer in one embodiment of the digital signal processing method of the present invention(s). In various embodiments, the graphical user interface 1500 may be displayed on a monitor, screen, or display on any digital device. The graphical user interface 1500 may be displayed using any operating system (e.g., Apple OS, Microsoft Windows, or Linux). The graphical user interface 1500 may also be displayed by one or more applications such as Apple Itunes.

The graphical user interface 1500 is optional. Various embodiments may be performed on a variety of hardware and software platforms that may or may not use a graphical user interface. In one example, some embodiments may be performed on a RIM Blackberry communication device. In another example, some embodiments may be performed on an application on a computer such as Apple Itunes.

For example, an existing media player or application may be configured (e.g., by downloading a plug-in or other software) to receive the profile and apply the filter equalizing coefficients to a graphic equalizer. In one example, a plug-in for Apple Itunes is downloaded and installed. The user may select music to play. The music signals may be intercepted from Apple Itunes and processed using one or more filters and a graphic equalizer configured by one or more profiles (optionally selected by the user). The processed signals may then be passed back to the application and/or operating system to continue processing or to output to a speaker. The plug-in may be downloaded and/or decrypted before installing. The profile may also be encrypted. The profile, in some embodiments, may comprise a text file. The application may allow the user the option to minimize the application and display the graphical user interface 1500.

In some embodiments, the graphical user interface 1500 displays a virtual media player and a means for the user to select one or more profiles. The on/off button 1502 may activate the virtual media player.

The built-in speaker button 1504, the desktop speaker button 1506, and the headphones button 1508 may each be selectively activated by the user through the graphical user interface 1500. When the user selectively activates the button 1504, the desktop speaker button 1506, or the headphones button 1508, an associated profile may be retrieved (e.g., from local storage such as a hard drive or firmware) or downloaded (e.g., from a communication network). The filter equalizing coefficients of the plurality of coefficients may then be used to configure a graphic equalizer to modify sound output. In one example, the profile associated with the headphones button 1508 comprises filter equalizing coefficients configured to adjust, modify, enhance or otherwise alter output of headphones that may be operatively coupled to the digital device.

The music button 1510 and the movie button 1512 may each be selectively activated by the user through the graphical user interface 1500. Similar to the built-in speaker button 1504, the desktop speaker button 1506, and the headphones button 1508, when the user selectively activates the music button 1510 or the movie button 1512, an associated profile may be retrieved. In some embodiments, the associated profile comprises filter equalizing coefficients that may be used to configure the filters of the graphic equalizer as to adjust, modify, enhance, or otherwise alter sound output.

It will be appreciated by those skilled in the art that multiple profiles may be downloaded and one or more of the filter equalizing coefficients of one profile may work with the filter equalizing coefficients of another profile to improve sound output. For example, the user may select the built-in speaker button 1504 which configures the filters of the graphic equalizer with filter equalizing coefficients from a first profile in order to improve sound output from the built-in speaker. The user may also select the music button 1510 which further configures the filter equalizing coefficients of the graphic equalizer with filter equalizing coefficients from a second profile in order to further improve the sound output of music from the built-in speaker.

In some embodiments, multiple profiles are not combined. For example, the user may select the built-in speaker button 1504 and the music button 1510 which retrieves a single profile comprising filter equalizing coefficients to improve or enhance the sound output of the music from the built-in speaker. Similarly, there may be a separate profile that is retrieved when the user activates the desktop speaker button 1506 and the music button 1510. Those skilled in the art will appreciate that there may be any number of profiles associated with one or more user selections of hardware, listening environment, and/or media type.

The rewind button 1514, the play button 1516, the forward button 1518, and the status display 1520 may depict functions of the virtual media player. In one example, after the user has selected the profiles to be used (e.g., through selecting the buttons discussed herein), the user may play a media file (e.g., music and/or a movie) through the play button 1516. Similarly, the user may rewind the media file using the rewind button 1514 and fast forward the media file using the fast forward button 1518. The status display 1520 may display the name of the media file to the user, as well as associated information about the media file (e.g., artist, total duration of media file, and duration of media file left to play). The status display 1520 may display any information, animation, or graphics to the user.

In various embodiments, a plug-in or application for performing one or more embodiments described herein must be registered before the plug-in or application is fully functional. In one example, a free trial may be downloadable by a user. The trial version may play a predetermined period of time (e.g., 1 minute) of enhanced sound or audio before returning the signal processing to the previous state (e.g., the sound may return to a state before the trial program was downloaded). In some embodiments, the unenhanced sound or audio may be played for another predetermined period (e.g., 1 or 2 minutes) and the signal processing may again return to enhancing the sound quality using the previously configured graphic equalizer and/or other filters. This process may go back and forth through the duration of the song. Once the registration of the plug-in or application is complete, the plug-in or application may be configured to process signals without switching back and forth.

The cell phone has become a fixture in the homes and offices of many U.S. and foreign consumers. As might be expected, the pursuit of consumers in this growing market has driven the providers of cellular telephones to offer a continuing profusion of new products and features that are designed to differentiate each company's product from the others and to entice the consumer to buy a particular brand of hardware. Market dynamics have resulted in a steady evolution of cell phones from single purpose communication devices into multimedia hubs that enable the user to capture video sequences, take pictures, listen to radio, play games, view and hear multimedia files, etc. Additionally, recent technological advances have made it possible for cell phone users to connect to and browse the Internet and to replicate many of the functions that a desktop PC Internet user is accustomed to having at his or her disposal.

In addition to the afore-mentioned hardware feature explosion, there has also been a similar trend toward increasing the amount of customization that users can apply to their phones. Early examples of user customization include after market cell phone case parts and bags. Today, however, the customization trend has taken a more technological turn and companies are increasingly allowing users to modify the cell phone operating system by, for example, selecting a background wallpaper for the LCD display, choosing a boot screen, assigning photo caller I.D.s, (using images that might be created by a cell phone digital camera), selecting custom ringtones, etc.

Of the foregoing, the selection and/or creation of cell phone ringtones has the potential to be one of the more lucrative customization trends. Of course, those of ordinary skill in the art will understand that, in simplest terms, ringtones are audio files that are played to notify a user of an incoming call or other cell phone event (e.g., receipt of a text message or notification of a waiting voice mail message). These files might contain digital audio information (e.g., MP3, MP4, or WAV), MIDI based tones, etc. More recently, ringtones have been used to differentiate the originator of incoming calls (e.g., certain callers get special rings) rather than being applied universally to all incoming calls.

Manufacturers have been quick to respond to the users' demand for higher fidelity MP3-type ringtones and especially polyphonic ringtones those that are based on popular songs, sound effects, etc. Polyphonic ringtones are complex tones that can recreate the sound of multiple instrument voices being played simultaneously. Polyphonic ringtones often take the form of MP3 (or similar) digitally recorded music or other audio files. In other variations, a polyphonic ringtone might be comprised of MIDI notes, wherein multiple MIDI notes are designed to be played simultaneously.

Of course, even when the ringtone source material is high fidelity the ringtone might still be perceived as being low fidelity when played through the small audio speaker that is typically found in cellular telephones. There are many reasons why cell phones do not contain high fidelity speakers but one of the more obvious is that this would be in opposition to the steadily shrinking size of such devices. That is, generally speaking, the larger the speaker the more faithful the reproduction of the sounds that is played there through and users are increasingly demanding small cellular phones for their ease in transportation and storage.

In various embodiments, systems and methods discussed herein enhance the sound of the program material, regardless of it being monophonic, polyphonic, mono, stereo, music, sound effect or any type of noise, for use as a ringtone on, without limitation, a cellular telephone, wireless (Bluetooth, IR or any other transfer mechanism) telephone, wired telephone, wired intercom, wireless (Bluetooth, IR or any other transfer mechanism) intercom or any other broadcast device that would reproduce the sound of the enhanced program material. These enhancements include, but are not limited to, adjusting the loudness, making the program material clearer with better articulation and modification to the frequency response for optimal performance on the device. The primarily source point for this processing may be but not limited to, music publishers, record labels, film companies, talking books, special effects developers and/or any other entity who would provide program material for use in a ringtone application.

In some embodiments, systems and methods described herein modify the original source program material by processing the incoming audio and enhancing the resulting output file to correct for the anomalies associated with the small speaker configuration of the device. The enhancement may occur using an equalizer to increase or decrease frequency, filters to increase or decrease frequency response, limiters to control dynamic range, compressors to control dynamic range, and/or expanders to control dynamic range. One or more profiles may be used to configure one or more components of systems to enhance and/or modify the original source program material (e.g., enhance the ringtone).

Figure 16:
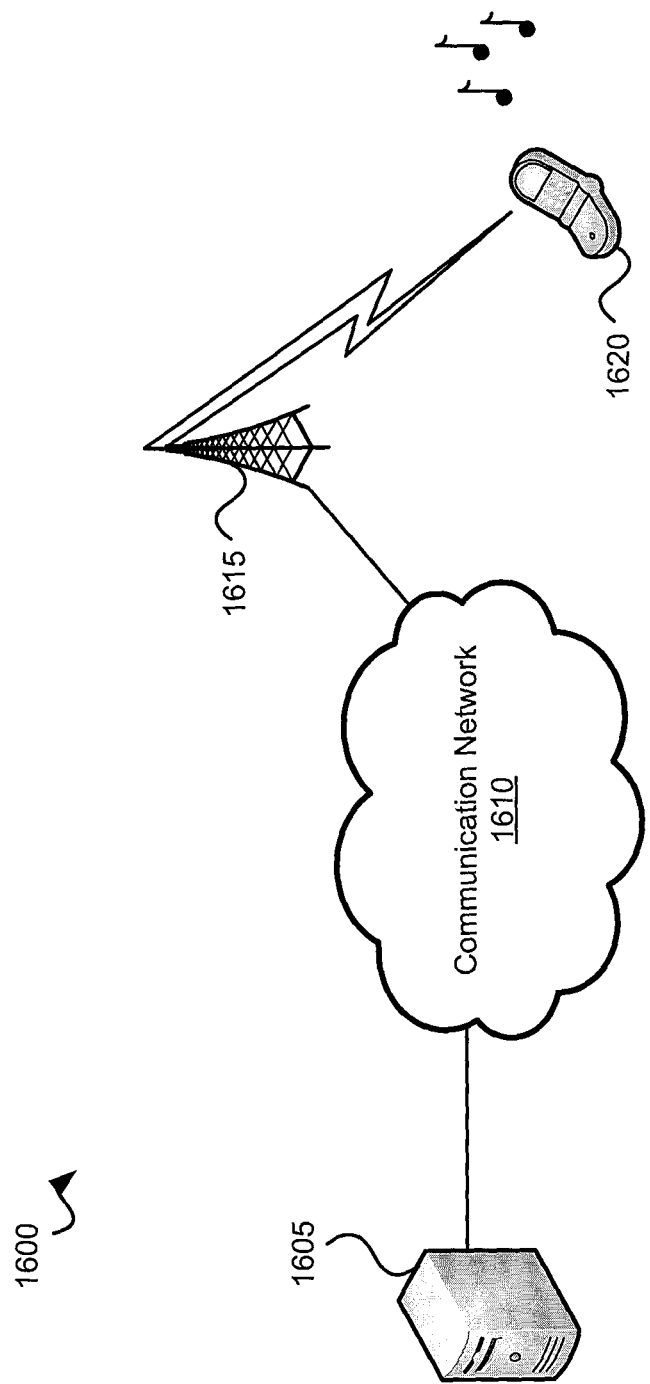
FIG. 16 is an environment depicting generating a profile, enhancement of a ringtone with the profile, and distribution of a ringtone in one embodiment of the present invention(s).

FIG. 16 is an environment 1600 depicting generating a profile, enhancement of a ringtone, and distribution of a ringtone in some embodiments of the present invention(s). Environment 1600 comprises a server 1605, a communication network 1610, a cell tower 1615, and a portable digital device 1620 in communication with the cell tower 1615. In various embodiments, ringtones may be enhanced using systems and methods described herein.

The server 1605 may be any digital device (e.g., computer module as described in FIG. 18) that includes processor and memory (e.g., RAM). The server 1605 may be configured to generate one or more profiles that may be used to enhance one or more ringtones, enhance one or more ringtones, and/or distribute enhanced ringtones. An enhanced ringtone is a ringtone that has been modified. In one example, an enhanced ringtone is a ringtone that has been modified through systems and methods described herein.

In some embodiments, the server 1605 may be configured to generate one or more profiles. A profile may be generated any number of ways. For example, a profile may be generated for a particular portable digital device such as a cellular phone and/or specific hardware components. A profile may also be generated for a specific genre of music (e.g., rock, pop, orchestral, movie sound track, folk, or country). Those skilled in the art will appreciate that there are many different profiles may be generated for different hardware and/or music.

In one example, a profile may be created that configures an equalizer to improve sound (e.g., of a ringtone) through the portable digital device (e.g., cellular telephone). A digital device may comprise mismatched components because such components may be inexpensive and lightweight. In one example, mismatched components may comprise an underrated magnet and basket mass when compared to conventional loudspeaker designs. The speaker with an underrated component may have a lighter driver with poor frequency response as well as other deficient physical specifications. The driver may also comprise mismatched and large windings in the speaker driver engine to overcome power handling requirements. The mismatched and large windings may also degrade the signal response of the speaker. Although the combination of mismatched components may result in a diminished frequency response, digital signal processing by a system including an equalizer configured by a profile may compensate for the physical deficiencies of a driver of the speaker. The digital signal processing may manipulate and condition the source program signals and result in high quality sound and a high frequency response.

Systems and methods for improving the output of systems with mismatched components is further described in U.S. nonprovisional patent application entitled, "Mismatched Speaker Systems and Methods," filed May 28, 2009, application Ser. No. 12/474,050 which is incorporated by reference in its entirety. Those skilled in the art will appreciate that a profile may be directed to specific models or types of hardware that is to work together in a digital device. The profile may then be used to configure the equalizer that is used to enhance a ringtone to be played over the specific models or types of hardware.

In some embodiments, a profile may be directed to a specific type and/or genre of sound or music that may be used as a ringtone. For example, a clip of pop music or a clip of an orchestral performance may be used as a ringtone. The orchestral performance may require a different dynamic range than music of different genres. As such, a profile may be generated to configure an equalizer to enhance the range including treble, bass, and other sound characteristics of different genres or types of music or sound.

Those skilled in the art will appreciate that a single profile may be generated to address different hardware and sound requirements. For example, a single profile may be generated for a specific type of cell phone (e.g., Iphone), hardware components within the cell phone, and country music. That profile may then be used to enhance one or more ringtones to be played over that cell phone with the specific hardware components playing country music.

In other embodiments, a single profile may be generated to enhance ringtones of a wide variety of different types of sounds (e.g., music of different genres) that are to be played over a wide variety of hardware. A single profile may be created for a model of cellular phone regardless of that physical components of that model may differ from device to device. Similarly, a single profile may be used for multiple models of digital devices (e.g., different models of cellular telephones).

In still other embodiments, one or more profiles may be used by a single carrier (e.g., AT&T or Verizon). For example, the one or more profiles may be used to enhance ringtones on all digital devices for that carrier.

The profile may be generated either automatically, manually, or a combination of both. In one example, sound engineers may collect information regarding the hardware (e.g., model of digital device to play the ringtone, type of digital device, and/or hardware components of the digital device) as well as the sound characteristics of the sound(s) to be played as a ringtone (e.g., genre, type, loudness, and pitch). The sound engineers may play the desired sound over the hardware and change the equalizer as necessary until the desired output is reached. The equalizer settings may then be saved as a profile that may be used on other ringtones. All or some of these steps may be performed manually or automatically.

The server 1605 may also be configured to enhance one or more ringtones. In some embodiments, a plurality of ringtones and/or sound sources (e.g., songs, soundtracks, audio clips) may be sent to the server 1605 (e.g., through a different digital device on a network or a storage device). The server 1605 may then enhance one or more of the ringtones and/or sound sources with a profile. Those skilled in the art will appreciate that a ringtone may include one or more sound sources such as a song, soundtrack, audio clip, and the like. In one example, a portion of a sound source may be used as a ringtone. In other embodiments, a ringtone may comprise any number of sound sources.

In some embodiments, the server 1605 may select one or more profiles to enhance a ringtone. For example, the server 1605 may select one or more profiles based on data (e.g., metadata) associated with the ringtone. For example, metadata associated with a ringtone may indicate the hardware that the ringtone is to be played and/or a music genre of the ringtone. Based on the information, the server 1605 may select one or more profiles from a plurality of profiles, configure the equalizer based on the one or more profiles, and then enhance the ringtone. The enhanced ringtone may be subsequently stored. Those skilled in the art will appreciate that the server 1605 may select a profile to enhance a ringtone based on any information and may be manual (e.g., selected by a user), automatic, or a combination.

The server 1605 may also distribute the enhanced ringtones including the enhanced sound sources (e.g., that may be used as a ringtone by a user of a portable digital device). For example, the server 1605 may provide ringtones for users of digital devices including portable digital devices. In some embodiments, the server 1605 may provide the ringtones to an application or ringtone store that allows users to purchase or download ringtones.

The communication network 1610 is any type of network that allows digital devices to communicate. The communication network 1610 may be a LAN, WAN, the Internet, or any kind of network. In some embodiments, the communication network may allow the server 1605 to communicate with the cell tower 1615 and/or the digital device 1620.

The cell tower 1615 may be any kind of station that allows wireless communication between multiple portable digital devices such as cellular phones and smartphones and the server 1605. In some embodiments, the cell tower 1615 allows a user with a digital device 1620 to communicate with the Internet and/or make telephone calls.

The digital device 1620 is any portable digital device that is configured to communicate over the communication network 1610 and play a ringtone. The digital device 1620 may be any digital device including a smartphone or other cellular device.

In some embodiments, a user of the digital device 1620 may download an enhanced ringtone, including, for example, an enhanced sound file that may be used as a ringtone or part of a ringtone, from the server 1605. The digital device 1620 may download the enhanced ringtone or sound file via an application or ringtone store, for example. Although the digital device 1620 is depicted in FIG. 16 as wirelessly communicating via the tower 1615, the digital device 1620 may download or receive the ringtone over a wired connection (e.g., through an Ethernet connection via the communication network).

Figure 17:
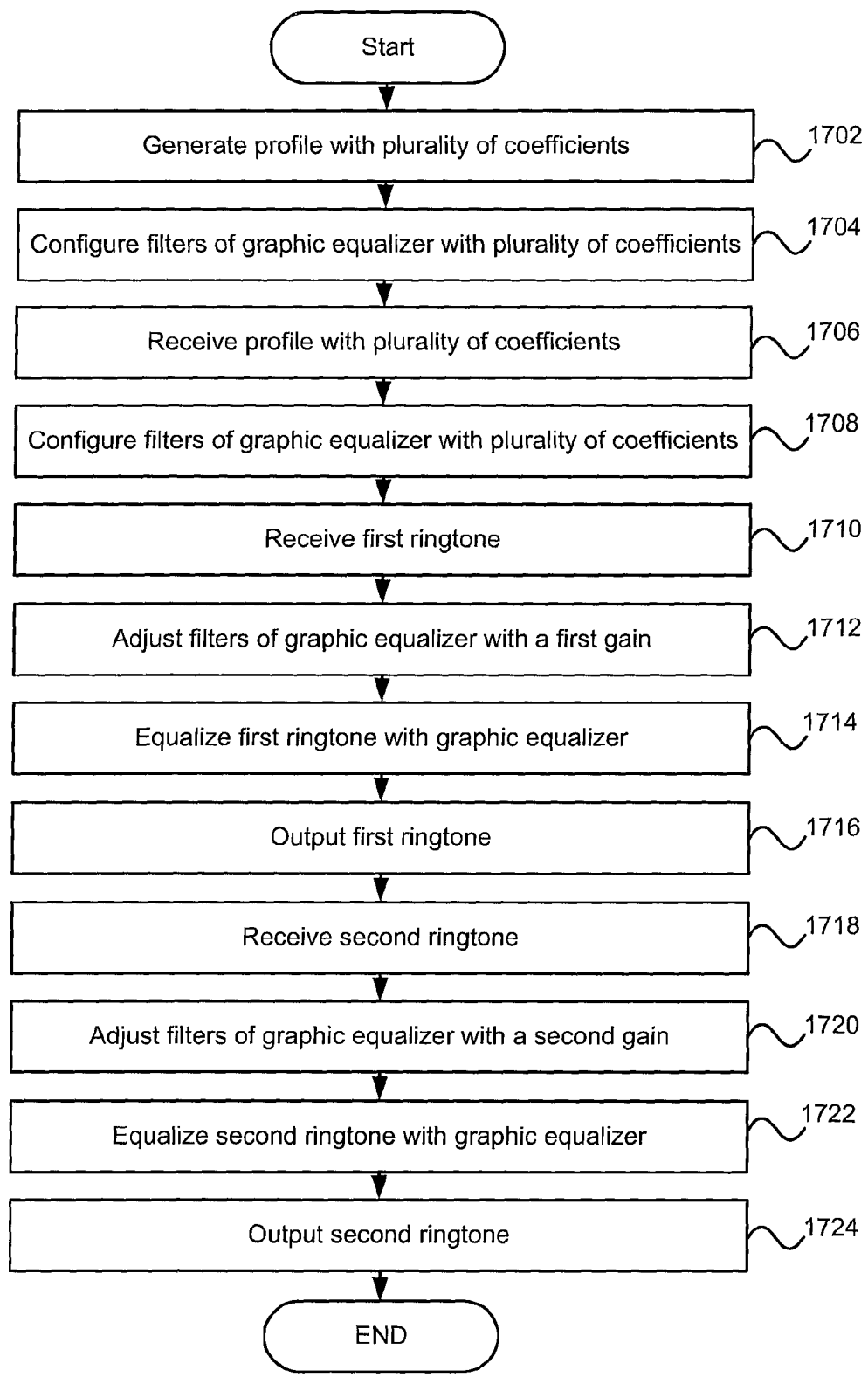
FIG. 17 is a flow chart for enhancing a ringtone with a graphic equalizer configured with a profile, the profile comprising a plurality of filter equalizing coefficients, in one embodiment of the digital signal processing method of the present invention(s).

FIG. 17 is a flow chart for enhancing a ringtone with a graphic equalizer 1300 configured with a profile, the profile comprising a plurality of filter equalizing coefficients, in one embodiment of the digital signal processing method of the present invention(s). In step 1702, the profile module 1304 generates a profile with a plurality of filter equalizing coefficients. In various embodiments, an engineer, sound professional, or user may generate a profile that is associated with a type of hardware, listening environment, and/or audio content of ringtone. In one example, an engineer may modify an existing profile based on hardware components of a digital device and/or a genre of music to be played as a ringtone.

In some embodiments, the profile is developed for a particular hardware combination of speaker or for a type of sound or music. The profile may be developed such that one or more ringtones will be equalized and processed to improve a perceived quality over the portable digital device.

The profile may be subsequently stored or sent to another digital device configured to enhance one or more ringtones, including, for example, sound files, with the generated profile. In one example, the profile is generated and sent to a server with access to a plurality of ringtones. The profile may be retrieved from a storage device (e.g., within a hard drive, network memory, Flash memory, or RAM), retrieved from firmware, or downloaded from a communication network (e.g., the Internet). In some embodiments, different profiles may be available for download. In one example, one or more profiles may be downloaded from a manufacturer, content provider, service provider, and/or a website.

In step 1704, the equalizing module 1306 configures filters of the graphic equalizer 1300 (e.g., equalizer filters of the filter module 1302) with the plurality of filter equalizing coefficients from the profile. The equalizing module 1306 or another module may also configure one or more other filters with other coefficients contained within the profile.

In some embodiments, one or more profiles may be selected based on a first ringtone and/or data associated with the ringtone. The equalizing module 1306 may configure the filters of the graphic equalizer 1300 based on the selected profile(s).

In one example, a variety of orchestral sound files (e.g., sound files containing orchestral music) may be provided to the server 1605 as a ringtone. The sound files or other data may indicate the genre of music to be used as a ringtone. A profile may be selected based on that information in order to enhance the sound file.

In step 1706, the equalizing module 1306 receives a first ringtone. The first ringtone may comprise a plurality of frequencies to be equalized by the preconfigured equalizer filters of the filter module 1302. The ringtone may be retrieved from local or remote storage.

In step 1708, the equalizing module 1306 adjusts filters of the graphic equalizer 1300 (e.g., the filters of the filter module 1302) using a first gain (e.g., a first gain value). In some embodiments, the gain is associated with a speaker. The gain may be associated with the desired characteristic of the sound to be stored. Further, the gain may be associated with the first ringtone. In some embodiments, the equalizing module 1306 adjusts of the filter module 1302 prior to receiving the first ringtone.

In step 1710, the equalizing module 1306 equalizes the first ringtone. In various embodiments, the equalizing module 1306 equalizes the first ringtone with the equalizer filters of the filter module 1302 that was configured by the filter equalizing coefficients of the profile and further adjusted by the gain.

The equalizing module 1306 may output the first ringtone in step 1412. In some embodiments, the first ringtone may be output to a speaker device or storage device. In other embodiments, the first ringtone may be output for further processing (e.g., by one or more compressors and/or one or more filters) and/or stored.

In step 1714, the equalizing module 1306 receives the second ringtone. In some embodiments, the equalizing module 1306 may select one or more different profiles and reconfigure the graphic equalizer 1300 based on data associated with the one or more different profiles. In one example, the second ringtone may be associated with data that indicates that the ringtone contains heavy metal music with a different variety of sound characteristics from the previous ringtone. One or more other profiles may be selected based on the different sound characteristics.

In step 1716, the equalizing module 1306 adjusts filters of the graphic equalizer 1300 with a second gain which may be associated with the other profile(s). In one example, the equalizing module 1306 further adjusts the filters of the filter module 1302 that were previously configured using the filter equalizing coefficients. The second gain may be associated with the first ringtone, the second ringtone, a speaker, or a sound characteristic. In some embodiments, this step is optional.

In step 1718, the equalizing module 1306 equalizes the second ringtone with the graphic equalizer 1300. In various embodiments, the equalizing module 1306 equalizes the second ringtone with the equalizer filters of the filter module 1302 that was configured by the filter equalizing coefficients of the profile and further adjusted by the first and/or second gain. The equalizing module 1306 may output the second ringtone in step 1720.

Those skilled in the art will appreciate that, in some embodiments, once the profile is generated, the profile may be sent to the portable digital device where the profile may be stored. Subsequently, all ringtones played by the portable digital device may undergo signal processing at the portable digital device using one or more profiles. For example, the signal processing at the portable digital device may utilize an equalizer that is configured using the profile. The ringtone may also be processed by further systems and methods discussed herein.

Figure 18:
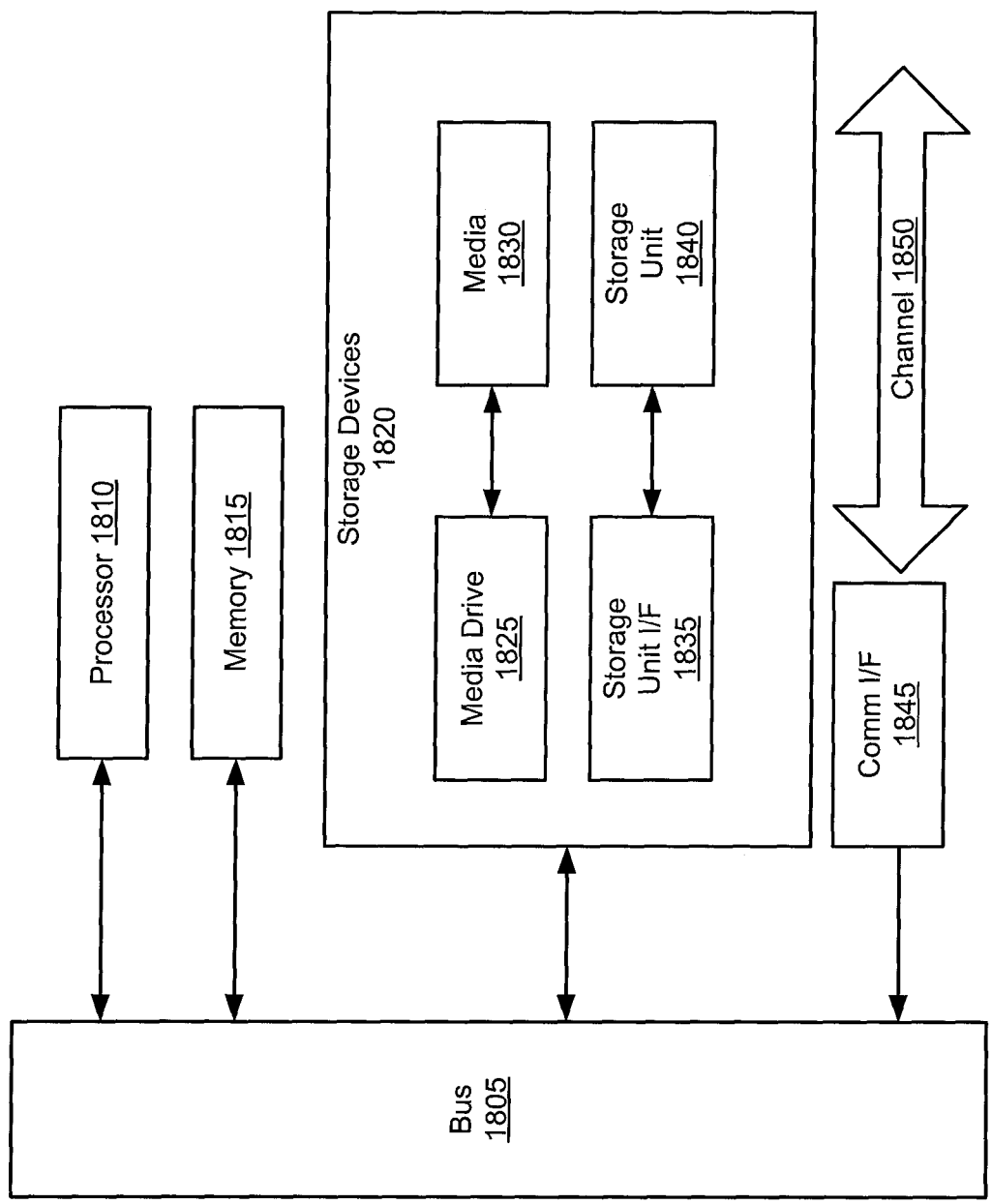
FIG. 18 is an illustration of an exemplary computer module (e.g., portable digital device or server) in which a computer processing method may be implemented.

FIG. 18 is an illustration of an exemplary computer module 1800 (e.g., portable digital device or server) in which a computer processing method may be implemented. The computer module 1800 may represent any digital device. Referring now to FIG. 18, computing module 1800 may represent, for example, computing or processing capabilities found within desktop, laptop and notebook computers, hand-held computing devices (PDA's, smart phones, cell phones, palmtops, etc.), mainframes, supercomputers, workstations or servers, music players, media players, ebook readers, or any other type of special-purpose or general-purpose computing devices as may be desirable or appropriate for a given application or environment. Computing module 1800 might also represent computing capabilities embedded within or otherwise available to a given device. For example, a computing module might be found in other electronic devices such as, for example, digital cameras, navigation systems, cellular telephones, portable computing devices, modems, routers, WAPs, and other electronic devices that might include some form of processing capability.

Computing module 1800 may include, for example, one or more processors or processing devices, such as a processor 1810. Processor 1810 may be implemented using a general-purpose or special-purpose processing engine such as, for example, a microprocessor, controller, or other control logic. In the example illustrated in FIG. 18, processor 1810 may be connected to a bus 1805 or other communication medium to facilitate interaction with other components of computing module 1800.

Computing module 1800 may also include one or more memory modules, referred to as main memory 1815. For example, preferably random access memory (RAM) or other dynamic memory, may be used for storing information and instructions to be executed by processor 1810. Main memory 1815 may also be used for storing temporary variables or other intermediate information during execution of instructions to be executed by processor 1810. Computing module 1800 may likewise include a read only memory (ROM) or other static storage device coupled to bus 1805 for storing static information and instructions for processor 1810.

The computing module 1800 may also include one or more various forms of information storage devices 1820, which may include, for example, a media drive 1825 and a storage unit interface 1835. The media drive 1825 may include a drive or other mechanism to support fixed or removable storage media 1830. The storage media 1830, may include, for example, a hard disk, a floppy disk, magnetic tape, cartridge, optical disk, a CD or DVD, or other fixed or removable medium that is read by, written to or accessed by media drive 1825. As these examples illustrate, the storage media 1830 may include a computer usable storage medium having stored therein particular computer software (e.g., instructions executable by a processor 1810 for performing a method) or data.

Information storage devices 1820 may include other similar instrumentalities for allowing computer programs or other instructions or data to be loaded into computing module 1800. Such instrumentalities may include, for example, a fixed or removable storage unit 1840 and an interface 1835. Examples of such storage units 1840 and interfaces 1835 may include a program cartridge and cartridge interface, a removable memory (for example, a flash memory or other removable memory module) and memory slot, a PCMCIA slot and card, and other fixed or removable storage units 1840 and interfaces 1835 that allow software and data to be transferred from the storage unit 1840 to computing module 1800.

Computing module 1800 may also include a communications interface 1845. Communications interface 1845 may be used to allow software and data to be transferred between computing module 1800 and external devices. Examples of communications interface 1845 might include a modem or softmodem, a network interface (such as an Ethernet, network interface card, WiMedia, 802.XX, WiMAX, LTE or other interface), a communications port (such as for example, a USB port, IR port, RS232 port Bluetooth interface, or other port), or other communications interface. Software and data transferred via communications interface 1845 may be carried on signals, which can be electronic, electromagnetic, optical or other signals capable of being exchanged by a given communications interface 1845. These signals may be provided to communications interface 1845 via a channel 1828. This channel 1828 may carry signals and may be implemented using a wired or wireless medium. Some examples of a channel may include a phone line, a cellular link, an RF link, an optical link, a network interface, a local or wide area network, and other wired or wireless communications channels.

In this document, the terms "computer program medium," "computer usable medium," and "computer readable medium," are used to generally refer to media such as, for example, a memory module, storage unit 1820, and/or media 1830. Instructions embodied on the medium, are generally referred to as "computer program code" or a "computer program product" (which may be grouped in the form of computer programs or other groupings). When executed (e.g., by a processor), such instructions might enable the computing module 1800 to perform features or functions of the present invention(s) as discussed herein.

Referring back to the equations above, a first-order shelving filter may be created by applying the equation $$A(z) = \frac{k_2 + k_1(1 + k_2)z^{-1} + z^{-2}}{1 + k_1(1 + k_2)z^{-1}k_2 z^{-2}}$$

to the first-order allpass filter A(z), where $$A(z) = \frac{\alpha - z^{-1}}{1 - \alpha z^{-1}}$$

where α is chosen such that $$\alpha = \frac{\left(1 - \sin\left(\frac{2\pi f_c}{F_s}\right)\right)}{\cos\left(\frac{2\pi f_c}{F_s}\right)}$$

where fc is the desired corner frequency and Fs is the sampling frequency. The allpass filter A(z) above may correspond to the difference equation $$y[k] = \alpha x[k] - x[k-1] + \alpha y[k-1].$$

If allpass coefficient α is referred to as allpass coef and the equation terms are rearranged, the above equation becomes y[k]=allpass_coef(x[k]+y[k−1])−x[k−1].

This difference equation may correspond to a code implementation of a shelving filter that is detailed below.

One specific software implementation of digital signal processing method 100 will now be detailed.

Input gain adjustment 101 and output gain adjustment 109, described above, may both be accomplished by utilizing a "scale" function, implemented as follows:

```
void scale(gain, float *input, float *output)
{
    for (i = 0; i < NSAMPLES; i++)
    {
        *output++ = inputGain * (*input++);
    }
}
```

First low shelf filter 102 and second low shelf filter 105, described above, may both be accomplished by utilizing a "low_shelf" function, implemented as follows:

```
void low_shelf(float *xv, float *yv, float *wpt, float *input, float *output)
{
    float 1;
    int i;
    for (i = 0; i < NSAMPLES; i++)
    {
        if (wpt[2] < 0.0) \\ cut mode, use conventional realization
        { \\ allpass_coef = alpha
            yv[0] = ap_coef * (*input) + (ap_coef * ap_coef − 1.0) *
            xv[0];
            xv[0] = ap_coef * xv[0] + *input;
            *output++ = 0.5 * ((1.0 + wpt[0]) * (*input++) +
            (1.0 − wpt[0]) * yv[0]);
        }
        else \\ boost mode, use special realization
        {
            1 = (ap_coef * ap_coef− 1.0) * xv[0];
            *output = wpt[1] * ((*input++) − 0.5 * (1.0 − wpt[0]) * 1);
            xv[0] = ap_coef * xv[0] + *output++;
        }
    }
}
```

The function declaration may provide:
void low_shelf(float *xv, float *yv, float *wpt, float *input, float *output)
The "low_shelf" function may take as parameters pointers to five different floating-point arrays. The arrays xv and yv may contain the "x" and "y" state variables for the filter. Because the shelving filters may be first-order filters, the state-variable arrays may be only of length one. There may be distinct "x" and "y" state variables for each shelving filter used in digital signal processing method 100. The next array used may be the array of filter coefficients "wpt" that pertain to the particular shelving filter. wpt may be of length three, where the elements wpt[0], wpt[1], and wpt[2] describe the following:

wpt[0]=G $wpt[1]=2[(1+G)+\alpha(1-G)]^{-1}$ wpt[2]=− when cutting, 1 when boosting and α is the allpass coefficient and G is the shelving filter gain. The value of α may be the same for all shelving filters because it is determined solely by the corner frequency (it should be noted that and all four of the shelving filters in digital signal processing method 100 have a corner frequency of 1 kHz). The value of G may be different for each of the four shelving filters.

The array "input" may be a block of input samples that are fed as input to each shelving filter, and the results of the filtering operation may be stored in the "output" array.

The next two lines of code,
float 1;
int i;
may allocate space for a loop counter variable, i, and an auxiliary quantity, 1, which may be the quantity 10[k] from FIG. 9.

The next line of code,
for (i=0; i<NSAMPLES; i++)
may perform the code that follows a total of NSAMPLES times, where NSAMPLES may be the length of the block of data used in digital signal processing method 100.

This may be followed by the conditional test
if (wpt[2]<0.0)
and, recalling the equations discussed above, wpt[2]<0 corresponds to a shelving filter that may be in "cut" mode, whereas wpt[2]>=0 may correspond to a shelving filter that may be in "boost" mode. If the shelving filter is in cut mode the following code may be performed:

```
if (wpt[2] < 0.0) \\ cut mode, use conventional realization
{       \\ allpass_coef = alpha
    yv[0] = ap_coef * (*input) + (ap_coef * ap_coef − 1.0) * xv[0];
    xv[0] = ap_coef * xv[0] + *input;
    *output++ = 0.5 * ((1.0 + wpt[0]) * (*input++) + (1.0 − wpt[0])
    * yv[0]);
}
```

The value xv[0] is simply the state variable x[k] and yv[0] may be yv[k]. The code above may be merely an implementation of the equations $$y[k] = \alpha \cdot in[k] = (\alpha^2 - 1) \cdot x[k]$$

$$x[k] = \alpha \cdot x[k] = in[k]$$

$$out[k] = \frac{1}{2}((1 + G) \cdot in[k] + (1 - G) \cdot y[k])$$

If the shelving filter is in cut mode the following code may be performed:

```
else \\ boost mode, use special realization
{
    1 = (ap_coef * ap_coef − 1.0) * xv [0]
    *output = wpt [1] * ((*input++) − 0.5 * (1.0 − wpt[0]) * 1);
    xv[0] = ap_coef * xv[0] + * output++;
}
``` which implements the equations $1_0[k]=(\alpha^2-1)\cdot x[k]$ $out[k]=2[(1+G)+\alpha(1-G)]^{-1}\cdot(in[k]-\frac{1}{2}(1-G)1_0[k])$ $x[k]=\alpha\cdot x[k-1]+out[k]$ First high shelf filter 103 and second high shelf filter 106, described above, may both be accomplished by utilizing a "high_shelf" function, implemented as follows:

```
void high_shelf(float *xv, float *yv, float *wpt, float *input, float
*output)
{
    float l;
    int i;
    for (i = 0; i < NSAMPLES; i++)
    {
        if (wpt[2] < 0.0) \\ cut mode, use conventional realization,
        { \\ allpass_coef = alpha
            yv[0] = allpass_coef * (*input) + (allpass_coef *
            allpass_coef - 1.0) *
        xv[0];
            xv[0] = allpass_coef * xv[0] + *input;
            *output++ = 0.5 * ((1.0 + wpt[0]) * (*input++) -
            (1.0 - wpt[0]) * yv[0]);
        }
        else \\ boost mode, use special realization
        {
            l = (allpass_coef * allpass_coef - 1.0) * xv[0];
            *output = wpt[1] * ((*input++) + 0.5 * (1.0 - wpt[0])
            * l);
            xv[0] = allpass_coef * xv[0] + *output++;
        }
    }
}
```

Implementing the high-shelving filter may be no different than implementing the low-shelving filter. Comparing the two functions above, the only substantive difference may be is in the sign of a single coefficient. Therefore, the program flow may be identical.

Graphic equalizer 107, described above, may be implemented using a series of eleven calls to a "bell" filter function, implemented as follows:

```
void bell(float *xv, float *yv, float *wpt, float *input, float *output)
{
    float geq_gain = wpt[0]; \\ G
    float geq_b0 = wpt[1]; \\ k2
    float geq_b1 = wpt[2]; \\ k1(1+k2)
    float ap_output;
    int i;
    for (i = 0; i < NSAMPLES; i++)
    {
        ap_output = geq_b0 * (*input - yv[0]) + geq_b1 * (xv[1] -
        yv[1]) + xv[0];
        xv[0] = xv[1]; \\ update
        xv[1] = *input; \\ update
        yv[0] = yv[1]; \\update
        yv[1] = *output; \\update
        *output++ = 0.5 * (1.0-gain) * ap_output + 0.5 * (1.0+gain) *
        (*input++);
    }
}
```

The function bell( ) may take as arguments pointers to arrays xv (the "x" state variables), yv (the "y" state variables), wpt (which contains the three graphic EQ parameters G, k2, and k1(1+k2)), a block of input samples "input", and a place to store the output samples. The first four statements in the above code snippet may be simple assignment statements.

The for loop may be executed NSAMPLES times, where NSAMPLES is the size of the block of input data. The next statement does the following:

$ap\_output = geq\_b0*(*input-yv[0])+geq\_b1*(xv[1]-yv[1])+xv[0]$

The above statement may compute the output of the allpass filter as described above. The next four statements may do the following:

$xv[0]=xv[1];$ shifts the value stored in x[k−1] to x[k−2].

$xv[1]=*input;$ shifts the value of input[k] to x[k−1].

$yv[0]=yv[1];$ shifts the value stored in y[k−1] to y[k−2].

$yv[1]=*output;$ shifts the value of output[k], the output of the allpass filter, to y[k−1].

Finally, the output of the bell filter may be computed as $*output++=0.5*(1.0-gain)*ap\_out+0.5*(1.0+gain)*$
$(*input++);$ First compressor 104 and second compressor 108, described above, may be implemented using a "compressor" function, implemented as follows:

```
void compressor(float *input, float *output, float *wpt, int index)
{
    static float level;
    float interp, GR, excessGain, L, invT, ftempabs;
    invT = wpt[2];
    int i, j;
    for (i = 0; i < NSAMPLES; i ++)
    {
        ftempabs = fabs(*input++);
        level = (ftempabs >= level)? wpt[0] * (level - ftempabs) +
        ftempabs : wpt[1] * (level - ftempabs) + ftempabs;
        GR = 1.0;
        if (level *invT > 1.0)
        {
            excessGain = level *invT;
            interp = excessGain - trunc(excessGain);
            j = (int) trunc(excessGain) - 1;
            if (j < 99)
            {
                GR = table[index][j] + interp * (table[index][j+1] -
                table[index][j]);
                // table[ ][ ] is the exponentiation table
            }
            else
            {
                GR = table[index][99];
            }
        }
        *output++ = *input++ * GR;
    }
}
```

The compressor function may take as input arguments pointers to input, output, and wpt arrays and an integer, index. The input and output arrays may be used for the blocks of input and output data, respectively. The first line of code,
    static float level;
may allocate static storage for a value called "level" which may maintain the computed signal level between calls to the function. The level may be tracked continuously, for the entire duration of the program, not just during execution of a single block of data.

The next line of code,
    float interp, GR, excessGain, L, invT, ftempabs;
may allocate temporary storage for a few quantities that are used during the computation of the compressor algorithm; these quantities may be only needed on a per-block basis and can be discarded after each pass through the function.

The next line of code,
    invT=wpt[2];
may extract the inverse of the compressor threshold, which may be stored in wpt[2], which may be the third element of the wpt array. The other elements of the wpt array may include the attack time, the release time, and the compressor ratio.

The next line of code may indicate that the compressor loop is repeated NSAMPLES times. The next two lines of code may implement the level computation as per the equations above. To see this, notice that the line level=(ftempabs>=level)?*wpt[*0]*(level−ftempabs)+ftempabs:*wpt[*1]*(level−ftempabs)+ftempabs;

may be equivalent to the expanded statement

```
if (ftempabs >= level)
{
    level = wpt[0] * (level − ftempabs) + ftempabs;
}
else
{
    level = wpt[1] * (level − ftempabs) + ftempabs
}
``` which is what may be needed to carry out the above necessary equation, with wpt[0] storing the attack constant αatt and wpt[1] storing the release constant αrel.

Next, in some embodiments, it can be assumed that the gain reduction, GR, is equal to unity. Then the comparison if (level*invT>1.0)

may be performed, which may be the same as asking if level >T, i.e., the signal level is over the threshold. If it is not, nothing may be done. If it is, the gain reduction may be computed. First, the excess gain may be computed as excessGain=level*invT;

as calculated using the equations above. The next two statements, interp=excessGain−trunc(excessGain);

j=(int)trunc(excessGain)−1;

may compute the value of index into the table of exponentiated values, as per the equations above. The next lines,

```
if (j < 99)
{
    GR = table[index][j] + interp * (table[index][j+i] − table[index][j]);
    // table[ ][ ] is the exponentiation table
}
else
{
    GR = table[index][99];
}
``` may implement the interpolation explained above. The two-dimensional array, "table," may be parameterized by two indices: index and j. The value j may be the nearest integer value of the excess gain. The table may have values equal to $$\text{table}[index][j] = (j)\frac{1 - index}{index}$$

which may be recognized as the necessary value from the equations above, where the "floor" operation may not needed because j may be an integer value. Finally, the input may be scaled by the computed gain reduction, GR, as per

*output++=*input++*GR;

and the value is written to the next position in the output array, and the process continues with the next value in the input array until all NSAMPLE values in the input block are exhausted.

It should be noted that in practice, each function described above may deal with arrays of input and output data rather than a single sample at a time. This may not change the program substantially, since the routines above were passed inputs and outputs by reference. Assuming that the algorithm may be handed a block of NSAMPLES in length, the only modification that may be needed to incorporate arrays of data into the bell-filter functions is to incorporate looping into the code as follows:

```
void bell(float *xv, float *yv, float gain, float *input, float *output)
{
    float ap_output;
    int i;
    for (i = 0; i < NSAMPLES; i++)
    {
        ap_output = geq_b0 * (*input − yv[0])
          + geq_b1 * (xv[1] − yv[1]) + xv[0]
        xv[0] = xv[1]; \\update
        xv[1] = *input; \\ update
        yv[0] = yv[1]; \\update
        yv[1] = *output; \\update
        *output++ = 0.5 * (1.0−gain) * ap_output + 0.5 *
            (1.0+gain) * (*input++);
    }
}
```

Digital signal processing method 100 as a whole, may be implemented as a program that calls each of the above functions, implemented as follows:

```
// it is assumed that floatBuffer contains a block of
// NSAMPLES samples of floating-point data.
// The following code shows the instructions that
// are executed during a single pass
scale(inputGain, floatBuffer, floatBuffer);
low_shelf(xv1_ap, yv1_ap, &working_table[0], floatBuffer, floatBuffer);
high_shelf(xv2_ap, yv2_ap, &working_table[3], floatBuffer, floatBuffer);
compressor(floatBuffer, floatBuffer, &working_table[6], ratio1Index);
low_shelf(xv3_ap_left, yv3_ap_left, xv3_ap_right, yv3_ap_right, &working_table[11], floatBuffer, floatBuffer);
high_shelf(xv4_ap_left, yv4_ap_left, xv4_ap_right, yv4_ap_right, &working_table[14], floatBuffer, floatBuffer);
bell(xv1_geq, yv1_geq, &working_table[17], floatBuffer, floatBuffer);
bell(xv2_geq, yv2_geq, &working_table[20], floatBuffer, floatBuffer);
bell(xv3_geq, yv3_geq, &working_table[23], floatBuffer, floatBuffer);
bell(xv4_geq, yv4_geq, &working_table[26], floatBuffer, floatBuffer);
bell(xv5_geq, yv5_geq, &working_table[29], floatBuffer, floatBuffer);
bell(xv6_geq, yv6_geq, &working_table[32], floatBuffer, floatBuffer);
bell(xv7_geq, yv7_geq, &working_table[35], floatBuffer, floatBuffer);
bell(xv8_geq, yv8_geq, &working_table[38], floatBuffer, floatBuffer);
bell(xv9_geq, yv9_geq, &working_table[41], floatBuffer, floatBuffer);
bell(xv10_geq, yv10_geq, &working_table[44], floatBuffer, floatBuffer);
bell(xv11_geq, yv11_geq, &working_table[47], floatBuffer, floatBuffer):
compressor(floatBuffer, floatBuffer, &working_table[50], ratio1Index);
scale(outputGain, floatBuffer, floatBuffer);
```

As can be seen, there may be multiple calls to the scale function, the low_shelf function, the high_shelf function, the bell function, and the compressor function. Further, there may be references to arrays called xv1, yv1, xv2, yv2, etc. These arrays may state variables that need to be maintained between calls to the various routines and they store the internal states of the various filters in the process. There may also be repeated reference to an array called working_table. This table may hold the various pre-computed coefficients that are used throughout the algorithm. Algorithms such as this embodiment of digital signal processing method 100 may be subdivided into two parts: the computation of the coefficients that may be used in the real-time processing loop and the real-time processing loop itself. The real-time loop may consist of simple multiplications and additions, which may be simple to perform in real-time, and the coefficient computation, which may require complicated transcendental functions, trigonometric functions, and other operations which may not be performed effectively in real-time. Fortunately, the coefficients may be static during run-time and can be pre-computed before real-time processing takes place. These coefficients may be specifically computed for each audio device in which digital signal processing method 100 may be used. Specifically, when digital signal processing method 100 may be used in a mobile audio device configured for use in vehicles, these coefficients may be computed separately for each vehicle the audio device may be used to obtain optimum performance and to account for unique acoustic properties in each vehicle such as speaker placement, passenger compartment design, and background noise.

For example, a particular listening environment may produce such anomalous audio responses such as those from standing waves. Such standing waves often occur, for example, in small listening environments such as an automobile. The length of an automobile, for example, is around 400 cycles long. In such an environment, some standing waves are set up at this frequency and some below. Standing waves may present an amplified signal at their frequency which may present an annoying acoustic signal. Vehicles of the same size, shape, and of the same characteristics, such as cars of the same model, may present the same anomalies due to their similar size, shape, structural make-up, speaker placement, speaker quality, and speaker size. The frequency and amount of adjustment performed, in a further embodiment, may be configured in advance and stored for use in graphic equalizer 107 to reduce anomalous responses for future presentation in the listening environment.

The "working tables" shown in the previous section may consist of precomputed values that are stored in memory and retrieved as needed. This may save a substantial amount of computation at run-time and may allow digital signal processing method 100 to run on low-cost digital signal processing chips.

It should be noted that the algorithm as detailed in this section may be written in block form. The program described above may be specific software embodiment of digital signal processing method 100, and may not be intended to limit the present invention(s) in any way. This software embodiment may be programmed upon a computer chip for use in an audio device such as, without limitation, a radio, MP3 player, game station, cell phone, television, computer, speakers, or public address system. This software embodiment may have the effect of taking an audio signal as input, and outputting that audio signal in a modified form.

While various embodiments of the present invention(s) have been described above, it should be understood that they have been presented by way of example only, and not of limitation. Likewise, the various diagrams may depict an example architectural or other configuration for the invention(s), which may be done to aid in understanding the features and functionality that may be included in the invention(s). The invention(s) are not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention(s). Also, a multitude of different constituent module names other than those depicted herein can be applied to the various partitions. Additionally, with regard to flow diagrams, operational descriptions and method embodiments, the order in which the steps are presented herein shall not mandate that various embodiments be implemented to perform the recited functionality in the same order unless the context dictates otherwise.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or embodied in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed:

1. A method comprising:
   generating a profile comprising a plurality of filter equalizing coefficients;
   configuring a plurality of filters using the plurality of filter equalizing coefficients from the profile; the plurality of filters comprising a first low shelf filter, a first high shelf filter, a second low shelf filter, and a second high shelf filter,
   receiving a ringtone for processing;
   adjusting the plurality of filters using a first gain;
   equalizing the ringtone using the plurality of filters by:
      processing the ringtone with the first low shelf filter and the first high shelf filter;
      compressing the ringtone with a first compressor;
      processing the ringtone with the second low shelf filter and the second high shelf filter; and
      compressing the ringtone with a second compressor, adjusting the gain of the compressed ringtone, and outputting the equalized ringtone.

2. The method of claim 1, further comprising receiving the profile from a communication network.

3. The method of claim 1, further comprising receiving the profile from firmware.

4. The method of claim 1, wherein the plurality of filters are configured using the plurality of filter equalizing coefficients to modify the ringtone to clarify a sound of music.

5. The method of claim 1, wherein the plurality of filters are configured using the plurality of filter equalizing coefficients to modify the ringtone to clarify a sound of music in a high noise environment.

6. The method of claim 1, wherein the plurality of filters are configured using the plurality of filter equalizing coefficients to modify the ringtone to adjust a sound associated with a media file for a handheld device.

7. The method of claim 1, wherein the plurality of filters of the graphic equalizer comprises eleven cascading second order filters.

8. The method of claim 7, wherein each of the second order filters are bell filters.

9. A system comprising:
   a filter module comprising a plurality of filters; the plurality of filters comprising a first low shelf filter, a first high shelf filter, a second low shelf filter, and a second high shelf filter;
   a profile module configured to receive a profile, the profile comprising a plurality of filter equalizing coefficients;
   an equalizing module configured to:
      configure the plurality of filters using the plurality of filter equalizing coefficients from the profile,
      receive a ringtone,
      adjust the plurality of filters using a first gain,
      equalize the ringtone using the plurality of filters, and
      output the equalized ringtone;
   a gain amplifier configured to amplify the ringtone;
   wherein the first low shelf filter is configured to filter the amplified ringtone;
   wherein the first high shelf filter is configured to filter the ringtone received from the first low shelf filter;
   a compressor configured to compress the filtered ringtone;
   wherein the second low shelf filter is configured to filter the compressed ringtone, and
   wherein the second high shelf filter is configured to receive the ringtone from the second low shelf filter and to filter the ringtone.

10. The system of claim 9, further comprising:
    a second compressor configured to compress the equalized ringtone; and
    a gain amplifier configured to receive the ringtone from the second compressor, amplify a gain of the ringtone, and output the ringtone.

11. A method of processing a ringtone, comprising:
    generating a profile, the profile comprising a plurality of filter equalizing coefficients;
    configuring a plurality of filters using a plurality of filter equalizing coefficients;
    adjusting the plurality of filters using a first gain;
    processing the ringtone by:
       processing the ringtone with a first low shelf filter,
       processing the ringtone received from the first low shelf filter with a first high shelf filter,
       compressing the ringtone with a first compressor,
       processing the compressed ringtone with a second low shelf filter,
       processing the ringtone received from the second low shelf filter with a second high shelf filter;
       compressing the ringtone received from the second high shelf filter with a second compressor;
       adjusting the gain of the signal; and
    outputting the processed ringtone.

12. The method of claim 11, further comprising receiving the plurality of filter equalizing coefficients from a communication network.

13. The method of claim 11, further comprising receiving the plurality of filter equalizing coefficients from firmware.

14. The method of claim 11, further comprising:
    adjusting a gain of the ringtone prior to processing the ringtone with the first low shelf filter.

* * * * *